United States Patent
Goto et al.

(10) Patent No.: US 10,986,278 B2
(45) Date of Patent: Apr. 20, 2021

(54) LENS APPARATUS, IMAGE PICKUP APPARATUS, PROCESSING APPARATUS, CAMERA APPARATUS, AND STORAGE MEDIUM

(71) Applicant: CANON KABUSHIKI KAISHA, Tokyo (JP)

(72) Inventors: Kazufumi Goto, Utsunomiya (JP); Tomoya Yamada, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/707,898

(22) Filed: Dec. 9, 2019

(65) Prior Publication Data
US 2020/0195852 A1  Jun. 18, 2020

(30) Foreign Application Priority Data
Dec. 14, 2018 (JP) .............................. JP2018-234727

(51) Int. Cl.
| H04N 5/232 | (2006.01) |
| G03B 17/14 | (2021.01) |
| G03B 13/32 | (2021.01) |
| H04N 5/225 | (2006.01) |
| H04N 5/238 | (2006.01) |

(52) U.S. Cl.
CPC ......... *H04N 5/23296* (2013.01); *G03B 13/32* (2013.01); *G03B 17/14* (2013.01); *H04N 5/2253* (2013.01); *H04N 5/238* (2013.01)

(58) Field of Classification Search
CPC .. H04N 5/23296; H04N 5/3572; H04N 5/217; H04N 5/23209; H04N 5/238; H04N 5/2253; H04N 5/2254; H04N 5/23212; G03B 13/32; G03B 17/14; G03B 7/18;
(Continued)

(56) References Cited

U.S. PATENT DOCUMENTS 9,294,668 B2 * 3/2016 Nobayashi ........... H04N 5/2254
10,432,865 B2 * 10/2019 Hyun ................. H04N 5/23287
(Continued)

FOREIGN PATENT DOCUMENTS

| JP | 2008-96907 A | 4/2008 |
| JP | 2017-34385 A | 2/2017 |
(Continued)

*Primary Examiner* — Hung H Lam
(74) *Attorney, Agent, or Firm* — Canon U.S.A., Inc. IP Division

(57) ABSTRACT

A lens apparatus includes an aperture stop, configured to form an image via the aperture stop and detachably mountable to a camera apparatus, a storage storing correction data for correcting image data obtained by image pickup by the camera apparatus, with respect to a light amount distribution in the image; and a communication device configured to transmit the correction data to an external apparatus. The correction data includes a coefficient of an n-th order polynomial (n is a non-negative integer) with respect to an image height, which corresponds to each of a plurality of states of the aperture stop. Minimum F-numbers at a wide angle end a telephoto end, focal lengths at the wide angle end and at the telephoto end, and F-numbers corresponding to the correction data are appropriately set.

20 Claims, 11 Drawing Sheets

(58) Field of Classification Search
CPC .......... G03B 9/06; G06T 5/008; G02B 7/102; G02B 13/16
See application file for complete search history.

(56) References Cited

U.S. PATENT DOCUMENTS

| | | |
|---|---|---|
| 2004/0257454 A1 | 12/2004 | Pinto et al. |
| 2012/0044369 A1* | 2/2012 | Irisawa .............. H04N 9/04519 348/208.4 |
| 2015/0181128 A1* | 6/2015 | Kaku ................... H04N 5/2251 348/143 |
| 2016/0316155 A1 | 10/2016 | Richards |

FOREIGN PATENT DOCUMENTS

| | | |
|---|---|---|
| JP | 2017-215409 A | 12/2017 |
| WO | 2018/179318 A1 | 10/2018 |

* cited by examiner

LENS APPARATUS, IMAGE PICKUP APPARATUS, PROCESSING APPARATUS, CAMERA APPARATUS, AND STORAGE MEDIUM

BACKGROUND OF THE INVENTION

Field of the Invention

The aspect of the embodiments relates to a lens apparatus, an image pickup apparatus, a processing apparatus, a camera apparatus, and a storage medium.

Description of the Related Art

In most of cameras for broadcasting (television cameras), cameras for movies, cameras for photographs, video cameras, and similar cameras, the light amount is smaller in a peripheral portion of an image plane than in a central portion of the image plane. The ratio of the light amount in the peripheral portion to the light amount in the central portion (also referred to as a 'peripheral light amount ratio' or 'relative illumination') changes as an optical system is operated by, for example, zooming, focusing, or the operation of an aperture stop. FIG. 11 is an example of the change. In FIG. 11, there is shown a ratio of a light amount at each image height to a light amount at a center of an image (image height of 0) in each of iris states of F2.0, F2.8, and F4.0. The light amount decreases less at a peripheral portion (high image height) by reducing an aperture diameter. The light amount at the peripheral portion changes not only due to an operation of the aperture stop but also due to operations of zooming and focusing.

A change of the ratio is caused by one or both of a change of the light amount in the central portion and a change of the light amount in the peripheral portion. A main cause is that, as the optical system is operated in the manner described above, a part of an axial light beam and an off-axis light beam cannot transmit a lens, the aperture stop, another optical member, or a structure member, for example. This is improved by increasing the effective diameter of the lens or a similar member so as to cover all paths of the axial light beam and the off-axis light beam that change as the optical system is operated. The increased effective diameter, however, is adverse to downsizing and downweighting of a lens apparatus. In addition, the increased effective diameter increases spherical aberration, field curvature, and other types of aberration, and correction thereof is difficult. A method has therefore been known in which a drop in light amount is corrected by image processing instead of being optically corrected. Correction of image data obtained by picking up an image by a camera apparatus with respect to a light amount distribution in an image formed by the lens apparatus is hereinafter referred to as "light amount correction" or "light amount compensation".

In Japanese Patent Application Laid-Open No. 2008-96907, there is disclosed a lens apparatus having information (correction data) on correction of decrease in lateral chromatic aberration and peripheral light amount, which is configured to transmit the information to a camera apparatus based on a command from the camera apparatus. In Japanese Patent Application Laid-Open No. 2017-34385, there is disclosed a configuration in which pieces of correction data are obtained relatively densely in a range having a larger variation in optical characteristic and pieces of correction data are obtained relatively sparsely in a range having a smaller variation in optical characteristic in an operation of the above-mentioned optical system.

The light amount correction in the above-mentioned image processing requires real-time processing in the case of picking up a moving image. Thus, the amount of communication of information between the lens apparatus and the camera apparatus or the size of correction data stored in advance for image processing is restricted. As a result, for example, although the peripheral light amount ratio changes in accordance with the iris state of the aperture stop, the correction data is to be discrete pieces of finite data with respect to the iris state, and thus processing of interpolating correction data is executed for an iris state between discrete iris states.

The interpolation processing includes, for example, replacing (nearest neighbor interpolation) correction data with correction data in an iris state closest to the current iris state, linear interpolation, or interpolation by an n-th order polynomial. In any interpolation processing, when a division pitch for the iris state is set to be sufficiently short, satisfactory processing of interpolating correction data can be executed. However, the division pitch becomes insufficiently shorter due to restriction on the data size as described above, and thus overcorrection or undercorrection may occur due to an error of interpolation in a range of the iris state in which a variation in peripheral light amount ratio is steep. In general, a lens for broadcasting enables the aperture stop to be opened or closed continuously, and thus it is important to prepare correction data in consideration of the interpolation error.

In Japanese Patent Application Laid-Open No. 2008-96907, no consideration is given to overcorrection or undercorrection due to an error of interpolation described above. Further, in Japanese Patent Application Laid-Open No. 2017-34385, there is a description of obtaining pieces of correction data densely in the range of an operation state of a lens apparatus having a larger variation in optical characteristic, but there is no description of the structure of correction data on the iris state, which is beneficial for a specific lens apparatus.

SUMMARY OF THE INVENTION

According to at least one embodiment of the disclosure, there is provided a lens apparatus including an aperture stop, and configured to form an image via the aperture stop and detachably mountable to a camera apparatus, the lens apparatus including: a storage storing correction data for correcting image data obtained by image pickup by the camera apparatus, with respect to a light amount distribution in the image; and a communication device configured to transmit the correction data to an external apparatus, wherein the correction data includes a coefficient of an n-th order polynomial (where n is non-negative integer) with respect to an image height, the correction data corresponding to each of a plurality of states of the aperture stop, wherein inequalities $1.10 < Ft/Fd < 4.00$; and $-0.01 < (Fd-Fw)/\mathrm{Log}(fd/fw) < 1.20$, are satisfied where Fw represents a minimum F-number at a wide angle end, Ft represents a minimum F-number at a telephoto end, fw represents a focal length at the wide angle end, ft represents a focal length at the telephoto end, and Fd represents a minimum F-number at a focal length fd expressed by fd=Fw/Ft×ft, and wherein the correction data satisfies inequalities $1.00 < Fwp\_2/Fw < 2.00$; and $Fwp\_2/Fwp\_1 < 1.41$, where Fwp_1 and Fwp_2 represent two F-numbers at the wide angle end respectively corresponding to two states of the plurality of states of the aperture stop in order from a maximum aperture side to a minimum aperture side of the aperture stop.

Further features of the disclosure will become apparent from the following description of exemplary embodiments with reference to the attached drawings.

DESCRIPTION OF THE EMBODIMENTS

Figure 1:
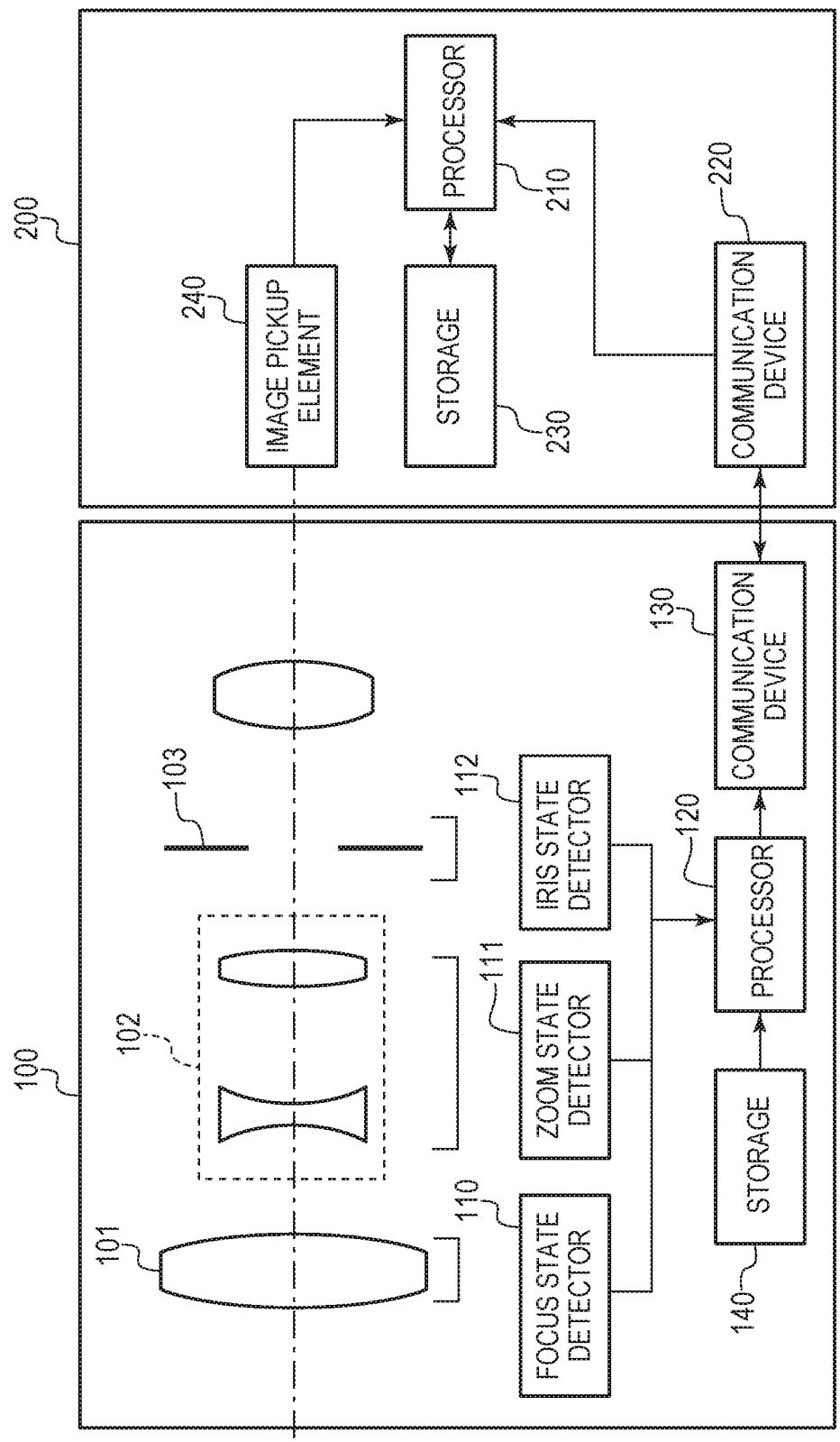
FIG. 1 is a diagram for illustrating an exemplary configuration of an image pickup apparatus according to a first embodiment of the disclosure.

Now, embodiments of the disclosure are described with reference to the attached drawings. Throughout all the drawings for illustrating the embodiments, in principle (unless otherwise specified), like components or the like are denoted by like reference numerals, and a repetitive description thereof is omitted.

First Embodiment

FIG. 1 is a diagram for illustrating an exemplary configuration of an image pickup apparatus according to a first embodiment of the disclosure. The image pickup apparatus is configured such that a lens apparatus 100 is detachably mounted to a camera apparatus 200. A focus lens unit 101 is configured to move for focusing. The focus lens unit may have a function of so-called inner focusing or floating focusing, in which a sub-unit of the focus lens unit moves for focusing. A zoom lens unit 102 is configured to move for zooming. The zoom lens unit may include three or more lens sub-units configured to move for zooming. An aperture stop 103 has an aperture diameter that can be changed in accordance with zooming or an operation performed by a user. The aperture stop can be operated continuously. A detector 110 (hereinafter also referred to as "focus state detector") is configured to detect a state (e.g., position) of the focus lens unit 101. When the focus lens unit 101 includes a plurality of lens sub-units, the detector 110 may detect only the state of any one of those lens sub-units, or may detect the state of each lens sub-unit. A detector 111 (hereinafter also referred to as "zoom state detector") is configured to detect the state (e.g., position) of the zoom lens unit 102. In general, the zoom lens unit 102 consists of two or more lens sub-units, but the detector 111 may detect only the state of any one of those lens sub-units, or may detect the state of each lens sub-unit. A detector 112 (hereinafter also referred to as "iris state detector") is configured to detect the state (e.g., aperture diameter, aperture diameter ratio, or effective F-number) of the aperture stop 103. An extender lens unit to be inserted into an optical path to shift the focal length range of the zoom lens unit and a detector (hereinafter also referred to as "insertion/removal state detector") configured to detect the state of insertion/removal of the extender lens unit may be added. Further, an image stabilizing lens unit for correcting image stabilization (for stabilization of image) and a detector (hereinafter also referred to as "image stabilizing state detector") configured to detect the state (e.g., position) of the image stabilizing lens unit may be added. Light amount correction in which asymmetry of the peripheral light amount ratio is taken into consideration may be performed based on a relationship between an amount of variation of the image stabilizing lens unit with respect to the optical axis and an amount of variation of the optical axis on an image plane. In any case, the state of the lens apparatus 100 is identified based on each state detected by each detector.

A processor (processing apparatus) 120 is configured to execute various kinds of processing in the lens apparatus. A communication device 130 is configured to transmit correction data for light amount correction to the camera apparatus 200. A storage 140 stores correction data, and may be formed of a non-volatile memory, for example. The storage 140 stores correction data as a coefficient of a term of each order of an n-th order expression (n is a non-negative integer) with respect to the image height for each state of the lens apparatus identified by states such as a focus sate, a zoom state, and an iris state. Details of the correction data are described later. The processor (processing apparatus) 120, the communication device 130, and the storage 140 may be formed of a single or plurality of logic devices or a combination of a logic device and a storage.

In the camera apparatus 200, a processor 210 is configured to execute various kinds of processing in the camera apparatus. A communication device 220 is configured to communicate to/from the lens apparatus. A storage 230 stores correction data transmitted from the lens apparatus 100. An image pickup element 240 is arranged on the image plane of the lens apparatus, and is configured to convert an image (optical signal) formed by the lens apparatus into an electric signal, and may be formed of a CCD or CMOS device, for example.

In the first embodiment, for example, a correction amount (≥1) based on an assumption that a light amount of an optical-axis position (position of image height of zero) in a reference state is set as a reference amount (1) is expressed by an n-th order expression (approximation) with respect to the image height for each state of the lens apparatus. That is, a correction amount D is expressed by the following polynomial with respect to the image height "h":

$$D_{(Z,O,P,i)}(h) = \Sigma_{j=0}^{n} A_{j(Z,O,P,i)} h^j \quad (1)$$

where D, "h", Z, O, P, and "i" represent the correction amount, the image height, the zoom state, the focus state, the iris state, and the insertion/removal state of the extender lens unit, respectively, and Aj(Z, O, P, i) represents a coefficient of a j-th order term with respect to the image height "h". The term "reference state" herein refers to a state of the lens apparatus identified by, for example, a specific zoom state, a specific focus state, a specific iris state, and a specific insertion/removal state. Specifically, for example, the term "reference state" refers to states such as a wide angle end, focus being at infinity, an aperture stop being open, and an insertion/removal state of the extender lens unit. The reference state may be set for each iris state or each insertion/removal state of the extender lens unit. It is possible to reduce the amount of correction data by representing the correction amount by an n-th order expression with respect to the image height and setting the coefficient as correction data.

When the correction amount D is expressed by a cubic expression with respect to the image height "h", the correction amount D is expressed by:

$$D = A3h3 + A2h2 + A1h + A0 \quad (2)$$

where A3, A2, A1, and A0 represents coefficients of third, second, first, and 0th order terms, respectively. The storage 140 stores the third, second, first, and 0th order coefficients A3, A2, A1, and A0 as correction data. The coefficients A3, A2, A1, and A0 are stored for each state of the lens apparatus as described above. In this case, the state may be identified by a finite number of states of the zoom lens unit, the focus lens unit, and the aperture stop and a finite number of states of the extender lens unit. When the current state of the lens apparatus is different from the finite number of states stored in the storage 140, the correction data (correction amount) is generated by interpolation processing. The interpolation processing may be processing of linear interpolation, for example. Further, the linear interpolation may be processing of nearest neighbor interpolation of generating correction data in a state closest to the current state of the lens apparatus among the states of the lens apparatus stored in the storage 140. In this manner, the interpolation processing may be performed by an interpolation method different from linear interpolation.

In the lens apparatus according to the first embodiment, a minimum F-number at the wide angle end, a minimum F-number at a telephoto end, a focal length at the wide angle end, and a focal length at the telephoto end are represented by Fw, Ft, "fw", and "ft", respectively. Further, a minimum F-number at a focal length "fd" expressed by "fd=Fw/Ft×ft" is represented by Fd. With the above-mentioned definitions, the lens apparatus satisfies the following inequalities.

$$1.10 < Ft/Fd < 4.00 \quad (3)$$

$$-0.01 < (Fd-Fw)/\text{Log}(fd/fw) < 1.20 \quad (4)$$

Inequality (3) defines the range of a ratio of the minimum F-number at the telephoto end to the minimum F-number at the focal length "fd". The lens apparatus having a configuration in which the ratio of Inequality (3) falls below the lower limit thereof has an excessively small variation in central light amount compared to the peripheral light amount. Thus, the variation in peripheral light amount ratio becomes excessively smaller, and an effect of correction in the first embodiment becomes excessively smaller. The lens apparatus having a configuration in which the ratio of Inequality (3) exceeds the upper limit thereof has an excessive emphasis on noise when the light amount at the telephoto end is corrected to about the light amount at the wide angle end.

Inequality (4) defines the range of a ratio of a change in F-number from the focal length "fw" at the wide angle end to the focal length "fd". The lens apparatus having a configuration in which the ratio of Inequality (4) falls below the lower limit thereof can be implemented by excessively increasing an effective diameter of an optical component, for example, the lens, but has a disadvantage in terms of downsizing and downweighting of the lens apparatus. Further, the lens apparatus has a disadvantage in terms of aberrations such as a spherical aberration and a curvature of field. In the lens apparatus having a configuration in which the ratio of Inequality (4) exceeds the upper limit thereof, the F-number changes excessively due to zooming, and thus, unless the number of pieces of correction data is set to be excessively large, an interpolation error of the correction data becomes excessively larger, resulting in overcorrection or undercorrection of the light amount.

Figure 2:
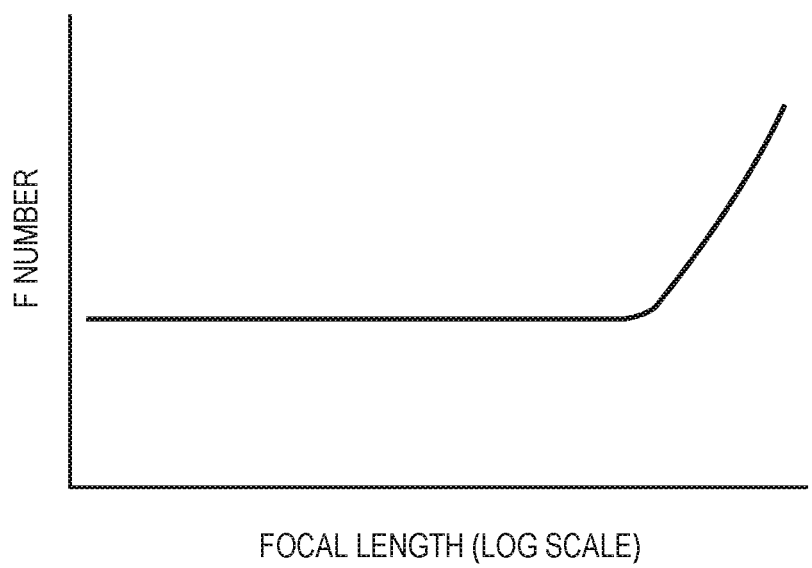
FIG. 2 is a graph for showing an exemplary relationship between a focal length (log scale) and an F-number.

In the lens apparatus satisfying Inequalities (3) and (4), the change in F-number is small in a range of from the wide angle end to a zoom state of the focal length "fd", and the F-number becomes significantly larger in a range of from the zoom state of the focal length "fd" to the telephoto end. This is a so-called "F-drop" phenomenon. In the lens apparatus having such a configuration, which includes a lens apparatus for broadcasting, the variation in peripheral light amount ratio is relatively large in the range of the iris state near the open state of the aperture stop, and thus it is effective to appropriately set the correction data in that range. FIG. 2 represents a change in F-number due to zooming in the lens apparatus satisfying Inequalities (3) and (4). FIG. 2 is a graph for showing an exemplary relationship between a focal length (log scale) and an F-number.

Figure 3:
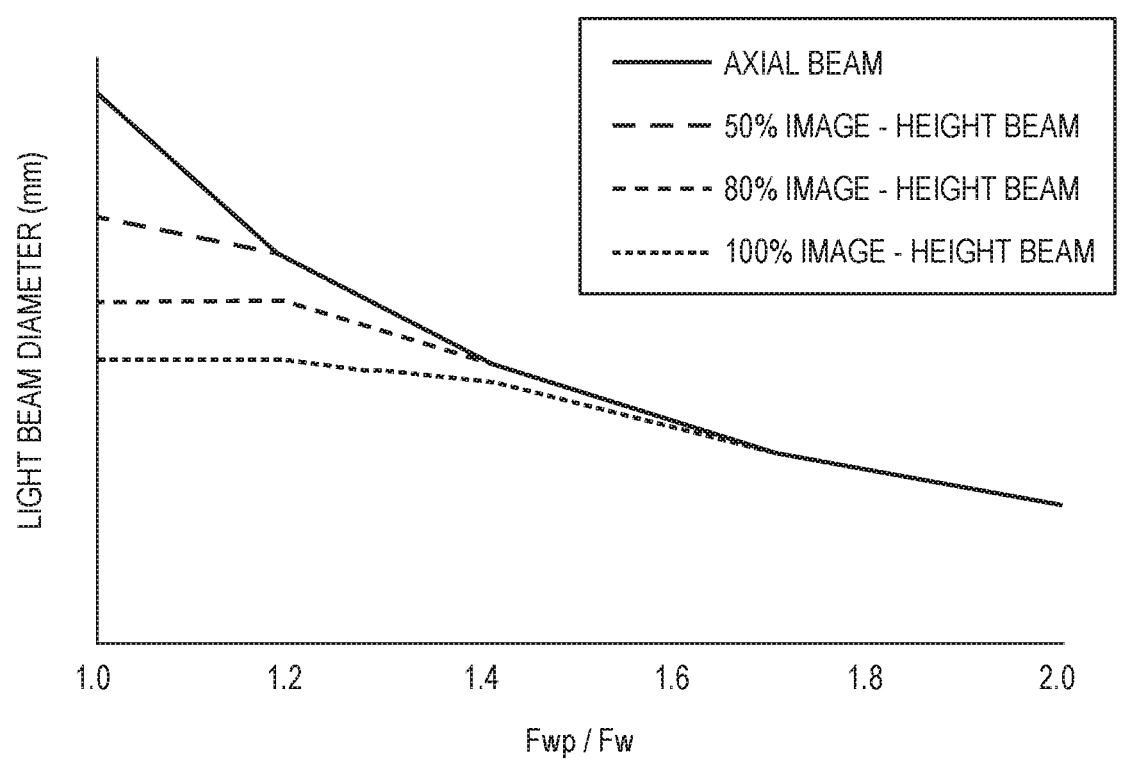
FIG. 3 is a graph for showing an exemplary relationship between an iris state of a lens apparatus and a light beam diameter for each image height on a stop surface.

Now, a configuration of correction data, which is effective for the lens apparatus satisfying Inequalities (3) and (4), is described. The correction data satisfies the following expressions:

$$1.00 < Fwp\_2/Fw < 2.00 \quad (5); \text{ and}$$

$$Fwp\_2/Fwp\_1 < 1.41 \quad (6),$$

where Fwp_1 and Fwp_2 represent two F-numbers at the wide angle end corresponding to respective two states among the plurality of states of the aperture stop in order from the open side of the aperture stop. Inequality (5) represents, as the characteristic of the zoom lens for broadcasting, the range of the iris state in which the variation in peripheral light amount ratio becomes steep (excessive). FIG. 3 is a graph for showing an exemplary relationship between the iris state of the lens apparatus at the wide angle end and a light beam diameter for each image height on the stop surface. More specifically, FIG. 3 represents an exemplary relationship between Fwp/Fw and the light beam diameter at the aperture stop of a light beam formed at each image height, where Fwp represents the F-number at the wide angle end. As described above, the variation in peripheral light amount ratio occurs due to a change in light amount in the central portion, a change in light amount in the peripheral portion, or both of those changes, and a cause of each change is an operation of the optical system. A part of an axial light beam or an off-axis light beam does not originally transmit the optical system due to restriction by, for example, a lens, a stop, other optical members, or a mechanical component, but a mode of transmission changes due to the operation. FIG. 3 represents the fact that, when the value of Fwp/Fw is 1.0 (iris state is open state) or close to 1.0, the light beam diameters formed at the respective image heights are different from each other, and the degree of decrease in light amount in the peripheral portion is relatively large compared to that of decrease in light amount in the central portion. Further, FIG. 3 represents the fact that, when the value of Fwp/Fw is 2.0 (iris state smaller than open state by two levels) or close to 2.0, the light beam diameters formed at the respective image heights are about the same as each other, and the degree of decrease in light amount in the peripheral portion is relatively small compared to that of decrease in light amount in the central portion.

The numerical range of Inequality (5) corresponds to the range of from the open state of the aperture stop in which the variation in peripheral light amount ratio is steep to the iris state of the aperture stop larger than the open state by two levels. Further, the numerical range represents a condition to be satisfied by F-numbers at the wide angle end corresponding to two states on a closed side among a plurality of states of the aperture stop. Inequality (6) represents a condition to be satisfied by a ratio between two F-numbers at the wide angle end corresponding to the two states. When the ratio of Inequality (6) exceeds the upper limit thereof, an interval between iris states corresponding to correction data becomes excessive in the range of the iris state in which the variation in peripheral light amount ratio is steep, and thus an interpolation error of correction data becomes larger, resulting in significantly (excessively) overcorrection or undercorrection of the peripheral light amount.

In one embodiment, the numerical range of Inequality (6) be set as follows.

$$Fwp\_2/Fwp\_1 < 1.30 \tag{6a}$$

Further, in another embodiment, the numerical range of Inequality (6) be set as follows.

$$Fwp\_2/Fwp\_1 < 1.19 \tag{6b}$$

Further, when the number of F-numbers Fwp in correction data satisfying the following inequality:

$$1.00 < Fwp/Fw < 2.00 \tag{7}$$

is represented by N02, and the total number of F-numbers Fwp in the correction data is represented by Nall, yet another embodiment of the disclosure satisfy Inequality (8).

$$0.30 < N02/Nall \tag{8}$$

Inequality (8) defines the ratio of the number of F-numbers Fwp in correction data satisfying Inequality (7) to the total number of F-numbers Fwp in the correction data. When the value of Inequality (8) falls below the lower limit thereof, the number of pieces of correction data becomes insufficient in the range of the iris state in which the variation in peripheral light amount ratio is steep, and thus an interpolation error of the correction data becomes larger, resulting in significant overcorrection or undercorrection of the peripheral light amount.

In one embodiment, the numerical range of Inequality (8) be set as follows.

$$0.34 < N02/Nall \tag{8a}$$

Further, yet another embodiment, the numerical range of Inequality (8) be set as follows.

$$0.38 < N02/Nall \tag{8b}$$

The first embodiment include two or more pieces of correction data corresponding to two or more Fwp satisfying the following inequality.

$$1.00 < Fwp/Fw < 1.19 \tag{9}$$

The range of Inequality (9) defines a range in which the variation in peripheral light amount ratio is particularly large within the range of Inequality (7). The lower limit of Inequality (9) corresponds to the open state of the aperture stop. The upper limit of Inequality (9) corresponds to an iris state smaller than the open state of the aperture stop by half the level. When this inequality is not satisfied, the number of pieces of correction data becomes insufficient in the range of the iris state in which the variation in peripheral light amount ratio is steep, and thus an interpolation error of the correction data becomes larger, resulting in significant overcorrection or undercorrection of the peripheral light amount.

When the number of F-numbers Fwp in correction data satisfying the following inequality:

$$2.00 < Fwp/Fw < 3.00 \tag{10}$$

is represented by N23, and the total number of F-numbers Fwp in the correction data is represented by Nall, the first embodiment is to satisfy Inequality (11).

$$0.10 < N23/Nall \tag{11}$$

The numerical range of Inequality (10) corresponds to a range of from the iris state larger than the open state by two levels to an iris state larger than the open state by three levels.

As shown in FIG. 3, in the lens apparatus according to the first embodiment, the light beam diameters formed at the respective image heights become about the same as the iris state becomes larger. However, the central ray of the off-axis light beam does not always match the center of the aperture stop, and thus the amount of light blocked by the aperture stop is different between a higher line and a lower line. Further, at the time of zooming from the specific focal length "fd" to the telephoto side, not only the off-axis light beam but also a part of the axial light beam does not transmit a front lens (first lens unit or focus lens unit). As the position becomes closer to the telephoto end, the amount of blocked light becomes larger, and the light beam diameter formed at each image height on the stop surface becomes smaller. In particular, such a phenomenon is significant in the range of from the open state to the iris state larger than the open state by three levels. Thus, the variation in peripheral light amount ratio is relatively large also in the range of Inequality (10). Such a phenomenon occurs in a lens apparatus in which the F-number closer to the telephoto side than the focal length "fd" is larger than the F-number at the wide angle end by two or more levels. Inequality (11) defines a ratio of the number of F-numbers Fwp in correction data satisfying Inequality (10) to the total number of F-numbers Fwp in the correction data. When the value of Inequality (11) falls below the lower limit thereof, the number of pieces of correction data becomes insufficient in the range of the iris state in which the variation in peripheral light amount ratio is steep, and thus an interpolation error of the correction data becomes larger, resulting in significant overcorrection or undercorrection of the peripheral light amount.

In one embodiment, the numerical range of Inequality (11) be set as follows.

$$0.12 < N23/Nall \tag{11a}$$

Further, in another embodiment, the numerical range of Inequality (11) be set as follows.

$$0.15 < N23/Nall \quad (11b)$$

In the first embodiment, the lens apparatus include the zoom lens unit and the focus lens unit, and the correction data relate to each of a plurality of combinations of states among the zoom state, the focus state, and the iris state. Further, in the first embodiment, the correction data be expressed by a quartic expression with respect to the image height "h". In this case, the correction amount D is expressed by the following quartic polynomial (quartic function):

$$D = A4(Z, O, P)h4 + A3(Z, O, P)h3 + A2(Z, O, P)h2 + A1(Z, O, P)h + A0(Z, O, P) \quad (12)$$

where "h" represents the image height. In Inequality (12), Z, O, and P represent the zoom state, the focus state, and the iris state, respectively. The storage 140 stores the fourth, third, second, first, and 0th order coefficients A4(Z, O, P), A3(Z, O, P), A2(Z, O, P), A1(Z, O, P), and A0(Z, O, P) in each state.

The first embodiment may include a user interface device (adjusting device) enabling setting of a correction coefficient to be multiplied by an n-th order term. With this, it is possible to adjust the correction amount in accordance with, for example, the degree of appearance of image noise. For example, in the case of a lens apparatus having a large F-drop, it is possible to reduce (uniformly reduce light amounts at all corrected image heights) the correction amount in a telephoto state, to thereby reduce the noise. This can be implemented by multiplying the same correction coefficient (<1) by all the terms of an n-th order polynomial including a constant term in this state. Further, for example, in the case of a lens apparatus having a greatly decreased peripheral light amount, it is possible to alleviate noise of a peripheral portion of the image while maintaining the light amount of the center of the image (image height of zero). This can be implemented by multiplying the same correction coefficient (<1) by all the terms of an n-th order polynomial other than a constant term. A correction coefficient larger than 1 may be adopted to improve a light amount correction effect or obtain an effect for visual representation, for example.

In the first embodiment, switching of whether the communication device of the lens apparatus transmits correction data to the communication device of the camera apparatus is enable. This enables execution of selective correction as required. Further, in the first embodiment, the communication device transmit correction data on the zoom state and the iris state among the zoom state, the focus state, and the iris state to an external apparatus, for example, the camera apparatus. The variation in peripheral light amount ratio due to a change in focus state is smaller than that due to a change in zoom state or iris state. Thus, it is possible to reduce the data size required for correction by transmitting only the correction data on the zoom state and the iris state to the external apparatus.

In the first embodiment, the aperture stop and a lens unit closer to the image side than the aperture stop not move for zooming. When the aperture stop and the lens unit closer to the image side than the aperture stop move for zooming, the F-number changes due to the zooming, and as a result, the light amount at the center of the image and the light amount at the peripheral portion of the image change excessively, which is likely to cause overcorrection or undercorrection. Further, in the first embodiment, the diameter of the aperture stop not to be changed due to zooming or focusing. Further, in the first embodiment, a first lens unit closest to the object side is a lens unit configured not to move for zooming, and may include a lens sub-unit configured to move for focusing. With this, the variation in peripheral light amount ratio is not steep with respect to the changes in respective states of the zoom lens unit, the focus lens unit, and the stop, and thus it is possible to provide a lens apparatus that is beneficial in that the amount of correction data is small or the correction accuracy is high. Further, when the focus lens unit moves also for zooming, the focal length also changes in order to change the object distance, and the light amount at the center of the image and the light amount at the peripheral portion change excessively, which is likely to cause overcorrection or undercorrection.

In the first embodiment, under the open state of the aperture stop, the following inequalities are satisfied:

$$1.21 < A0(ft)/A0(fd) < 16.0 \quad (13); \text{ and}$$

$$-0.01 < (A0(fd) - A0(fw))/\text{Log}(fd/fw) < 0.50 \quad (14),$$

where "fw", A0(fw), A0(ft), and A0(fd) represent the focal length at the wide angle end, the coefficient A0 at the focal length "fw", the coefficient A0 at the focal length "ft", and the coefficient A0 at the focal length "fd", respectively. In a lens apparatus in which the first lens unit is a lens unit configured not to move for zooming and the first lens unit includes a lens sub-unit configured to move for focusing, the F-number ray on the telephoto side is defined by a lens diameter of the first lens unit. In this case, the light amount can be corrected by satisfying the following conditions.

$$A0(fd) < A0(ft) \quad (15)$$

$$A0(fw) = A0(fd) \quad (16)$$

FIG. 2 is an illustration of a change in F-number in a lens apparatus having characteristics of Inequalities (15) and (16) as well as characteristics of Inequalities (3) and (4). In a lens apparatus in which the first lens unit is configured not to move for zooming and the F-number ray on the telephoto side is defined by the lens diameter of the first lens unit, as shown in FIG. 2, the F-number is set to be a fixed value in the range of from the wide angle end to the zoom state of a predetermined focal length. Thus, the lens apparatus satisfies Inequalities (15) and (16). However, an image (video) to be visually recognized by the user is influenced by the characteristic of the camera apparatus including a characteristic of an image pickup element and processing on a signal transmitted from the camera apparatus, for example. Further, when correction is performed based on limited data due to a restriction on a capacity of communication or storage, an error of interpolation processing occurs, and thus Inequalities (15) and (16) may not always be satisfied. In such a case, Inequalities (13) and (14) may be satisfied.

In the first embodiment, an extender lens unit and a detector configured to detect an insertion/removal state of the extender lens unit be included, to switch correction data based on the insertion/removal state. In a lens apparatus including the extender lens unit, the F-number changes depending on the insertion/removal state of the extender lens unit, and the peripheral light amount ratio also changes. Thus, it is possible to perform more accurate correction by switching correction data based on the insertion/removal state with individual pieces of correction data in respective states of insertion/removal of the extender lens unit.

In one embodiment, the numerical ranges of Inequalities (3), (4), (13), and (14) be set as follows.

$$1.10 < Ft/Fd < 3.80 \tag{3a}$$

$$-0.01 < (Fd-Fw)/\text{Log}(fd/fw) < 1.00 \tag{4a}$$

$$1.21 < A_{0(ft)}/A_{0(fd)} < 14.0 \tag{13a}$$

$$-0.01 < (A_{0(fd)} - A_{0(fw)})/\text{Log}(fd/fw) < 0.40 \tag{14a}$$

Further, in another embodiment, the numerical ranges of Inequalities (3), (4), (13), and (14) be set as follows.

$$1.20 < Ft/Fd < 3.50 \tag{3b}$$

$$-0.01 < (Fd-Fw)/\text{Log}(fd/fw) < 0.50 \tag{4b}$$

$$1.44 < A_{0(ft)}/A_{0(fd)} < 12.25 \tag{13b}$$

$$-0.01 < (A_{0(fd)} - A_{0(fw)})/\text{Log}(fd/fw) < 0.20 \tag{14b}$$

Figure 4:
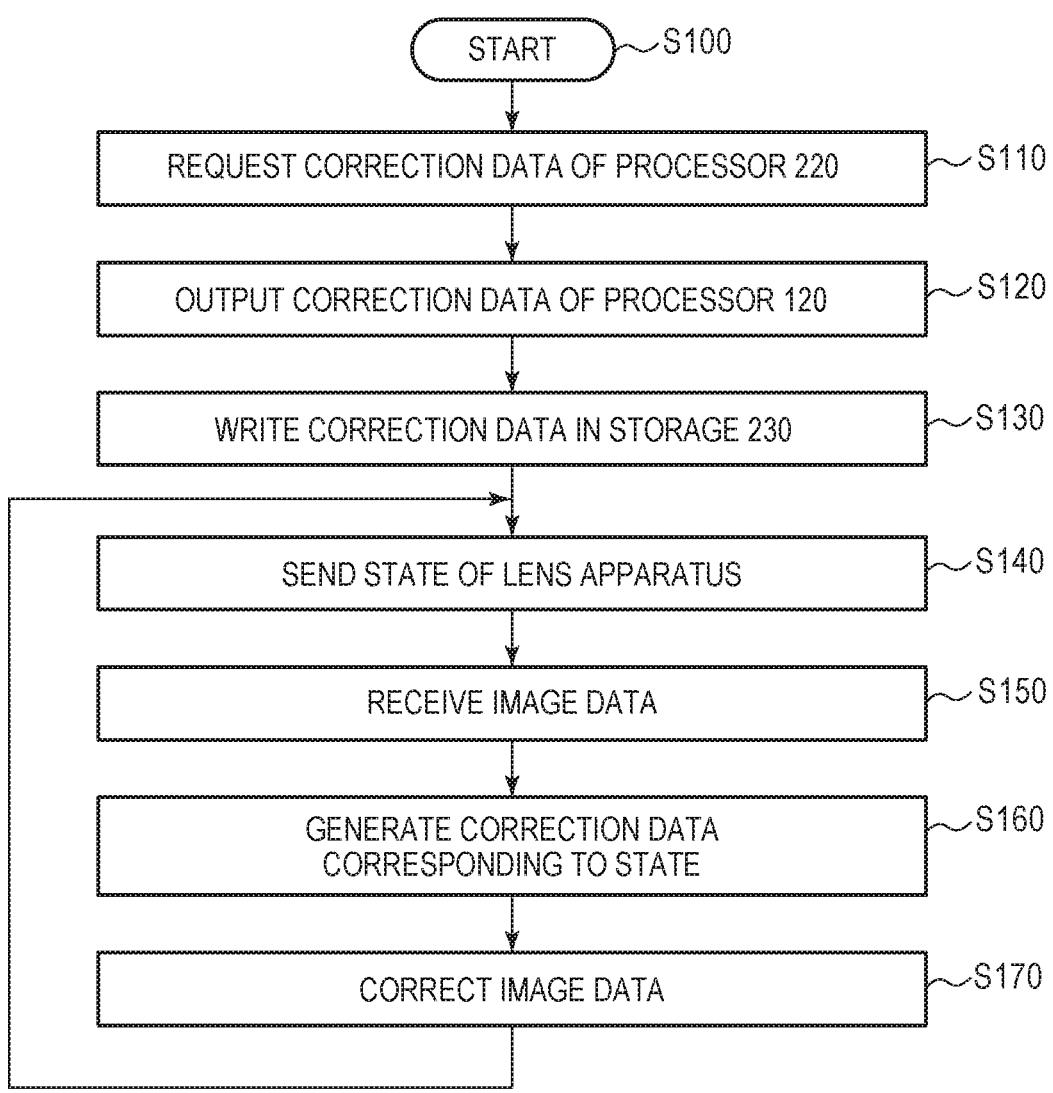
FIG. 4 is a flowchart for illustrating a flow of processing in the first embodiment.

FIG. 4 is a flowchart for illustrating a flow of processing in the first embodiment. In Step S100, the processing is started. In Step S110, first, the processing apparatus 210 of the camera apparatus 200 requests the processor 120 of the lens apparatus 100 for correction data via the communication device 220 of the camera apparatus 200 and the communication device 130 of the lens apparatus 100. In Step S120, the processor 120 of the lens apparatus 100 reads correction data from the storage 140. Then, the processor 120 outputs the correction data to the processor 210 of the camera apparatus 200 via the communication device 130 of the lens apparatus 100 and the communication device 220 of the camera apparatus 200. In Step S130, the processor 210 of the camera apparatus 200 writes the received correction data in the storage 230.

The subsequent processing is processing for one frame of an image (video). In Step S140, the processor 120 of the lens apparatus 100 obtains respective states (states of lens apparatus) from the focus state detector 110, the zoom state detector 111, and the iris state detector 112. Then, the processor 120 of the lens apparatus 100 outputs the states of the lens apparatus to the processor 210 of the camera apparatus 200 via the communication device 130 of the lens apparatus 100 and the communication device 220 of the camera apparatus 200.

In Step S150, the processor 210 of the camera apparatus 200 receives image data (video data) from the image pickup element 240. In Step S160, the processor 210 of the camera apparatus reads correction data corresponding to the state of the lens apparatus received in Step S140 from the storage 230 of the camera apparatus 200. The correction data stored in the storage 230 of the camera apparatus 200 is discrete pieces of data for respective states of the focus state, the zoom state, and the iris state. Thus, when the processor 210 of the camera apparatus 200 has identified the state of the lens apparatus, the processor 210 generates correction data corresponding to the identified state by interpolation processing based on the read correction data. In Step S170, the processor 210 of the camera apparatus 200 generates a correction amount based on the generated correction data, and corrects image data based on the correction amount. After that, the processing returns to Step S140, and the processing is continued until a predetermined end condition is satisfied.

Figure 5:
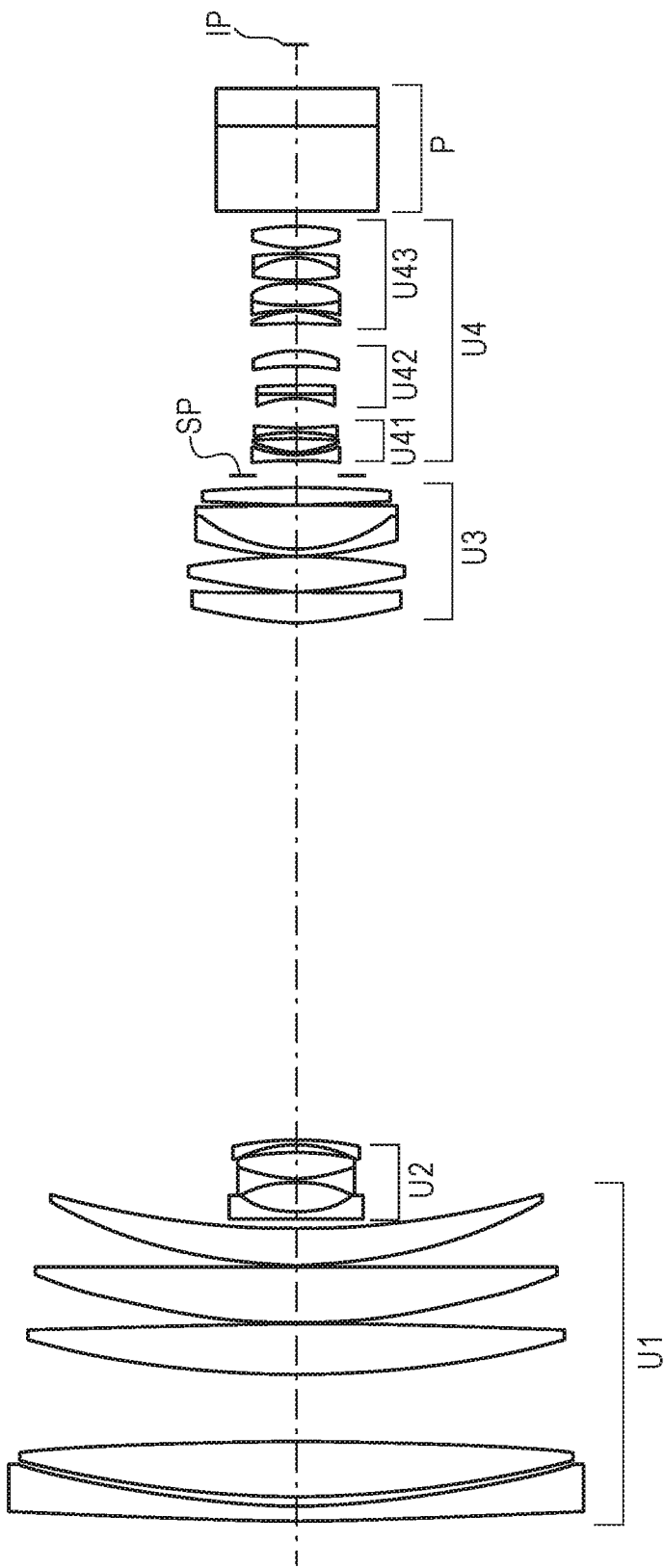
FIG. 5 is a diagram for illustrating an optical system of the lens apparatus.

Now, a configuration of the optical system of the lens apparatus according to the first embodiment is described. FIG. 5 is a diagram for illustrating the optical system of the lens apparatus. FIG. 5 is a cross-sectional view of the optical system in the state in which focus is at infinity at the wide angle end. In FIG. 5, a first lens unit U1 having a positive refractive power is configured not to move for zooming. A part of the first lens unit of U1 is configured to move toward the object side for focusing from the infinity toward close distance. A second lens unit U2 having a negative refractive power is configured to move toward the image side for zooming from the wide angle end (short focal length end) to the telephoto end (long focal length end). A third lens unit U3 having a positive refractive power is configured to move in association with the second lens unit U2 to correct (compensate for) image plane variation due to magnification. The aperture stop is denoted by SP. A fourth lens unit U4 having a positive refractive power consists of, in order from the object side, a first lens sub-unit, a second lens sub-unit, and a third lens sub-unit having a positive refractive power. Although the fourth lens unit U4 is configured not to move for zooming, all or a part of the fourth lens unit U4 may be configured to move to correct (reduce) image blur due to various kinds of causes. An optical block P includes at least one of a prism, an optical filter, or other components. An image plane of the lens apparatus is denoted by IP, and when the lens apparatus is connected to the camera apparatus, an image pickup element (photoelectric conversion element) is arranged on the image plane IP.

Next, a configuration of each lens unit is described. The first lens unit U1 consists of, in order from the object side to the image side, a negative lens, a positive lens, a positive lens, a positive lens, and a positive lens. The three positive lenses closest to the image side are configured to move from the image side to the object side for focusing. The second lens unit U2 consists of, in order from the object side to the image side, a negative lens, a cemented lens of a negative lens and a positive lens, and a negative lens. The third lens unit U3 consists of, in order from the object side to the image side, a positive lens, a positive lens, a cemented lens of a negative lens and a positive lens, and a positive lens. The first lens sub-unit U41 consists of, from the object side to the image side, a negative lens, a positive lens, and a negative lens. The second lens sub-unit U42 consists of, from the object side to the image side, a cemented lens of a negative lens and a positive lens, and a positive lens. The third lens sub-unit U43 consists of, from the object side to the image side, a positive lens, a cemented lens of a negative lens and a positive lens, a cemented lens of a positive lens and a negative lens, and a positive lens.

Numerical Example of the optical system of the lens apparatus 100 is as described later. In Numerical Example, an order of a surface from the object side is represented by "i". A curvature radius of an i-th surface from the object side is represented by "ri", and an interval between an i-th surface and an (i+1)th surface from the object side is represented by "di". A refractive index and an Abbe number of an optical component (optical medium) between the i-th surface and the (i+1)th surface are represented by "ndi" and "vdi", respectively. An air-equivalent back focus is represented by BF. The last three surfaces are surfaces in a glass block, for example, a filter. In Numerical Example, the asterisk (*) attached to the surface number indicates that the surface is aspherical.

The aspherical shape is expressed by setting an X axis in the optical axis direction, an H axis in a direction perpendicular to the optical axis, and defining the direction of travel of light as positive. Further, a paraxial curvature radius is represented by R, a conic constant is represented by "k", and aspherical coefficients are represented by A4, A6, A8, . . . , A16, A3, A5, A7, ..., and A15, to express the aspherical shape by the following expression. Further, "e-Z" represents "×10$^{-Z}$".

$$X = \frac{H^2/R}{1 + \sqrt{1-(1+k)(H/R)^2}} + A4H^4 + A6H^6 +$$
$$A8H^8 + A10H^{10} + A12H^{12} + A14H^{14} + A16H^{16} + A3H^3 +$$
$$A5H^5 + A7H^7 + A9H^9 + A11H^{11} + A13H^{13} + A15H^{15}$$

Figure 6A:
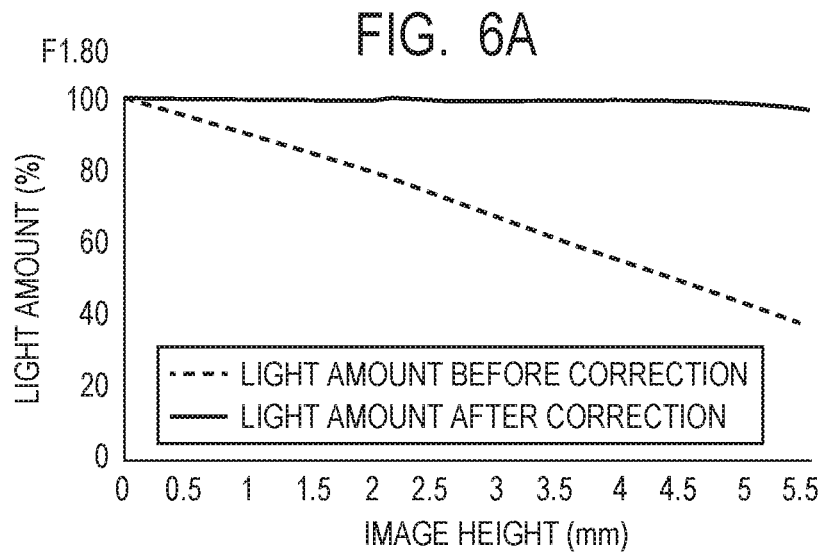
FIG. 6A is a graph for showing light amount distributions before and after correction at F1.80.
Figure 6B:
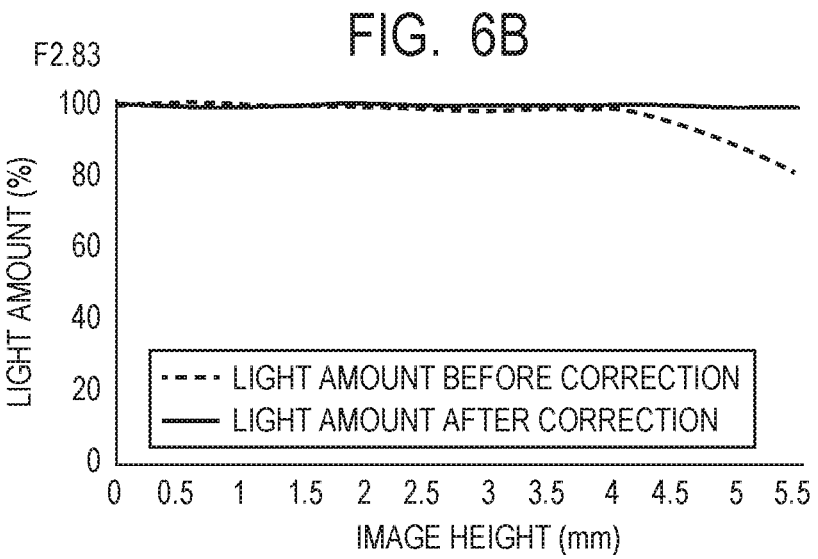
FIG. 6B is a graph for showing light amount distributions before and after correction at F2.83.
Figure 6C:
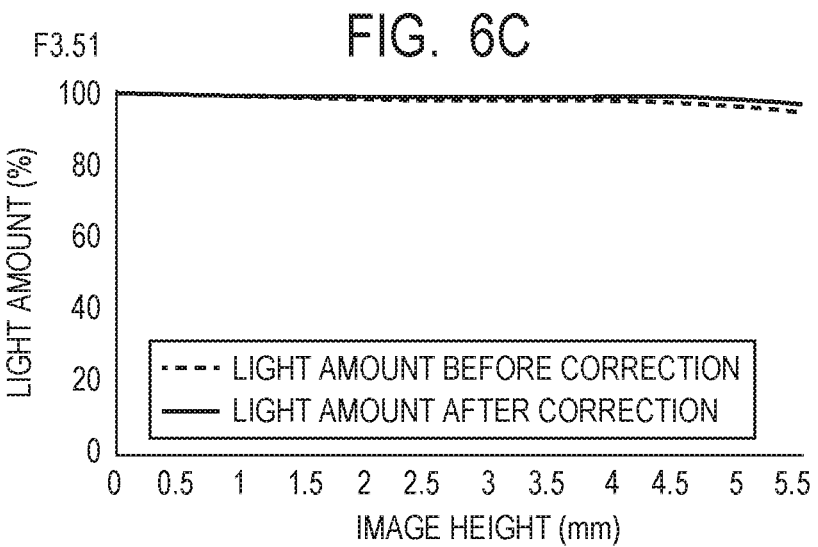
FIG. 6C is a graph for showing light amount distributions before and after correction at F3.51.

FIG. 6A, FIG. 6B, and FIG. 6C are graphs for showing light amount distributions before and after correction. The state of the lens apparatus that has obtained image data relating to FIG. 6A, FIG. 6B, and FIG. 6C is a state in which the focal length is 348.30 mm and focus is at infinity. Further, the iris state is F1.80 in FIG. 6A, F2.83 in FIG. 6B, and F3.51 in FIG. 6C. FIG. 6A to FIG. 6C each represent light amounts before correction and a light amount after correction in a case where the image is corrected with correction data of coefficients of a quartic polynomial with respect to the image height. FIG. 6A to FIG. 6C each represent a case in which the central part of the image is also corrected.

Second Embodiment

Figure 7:
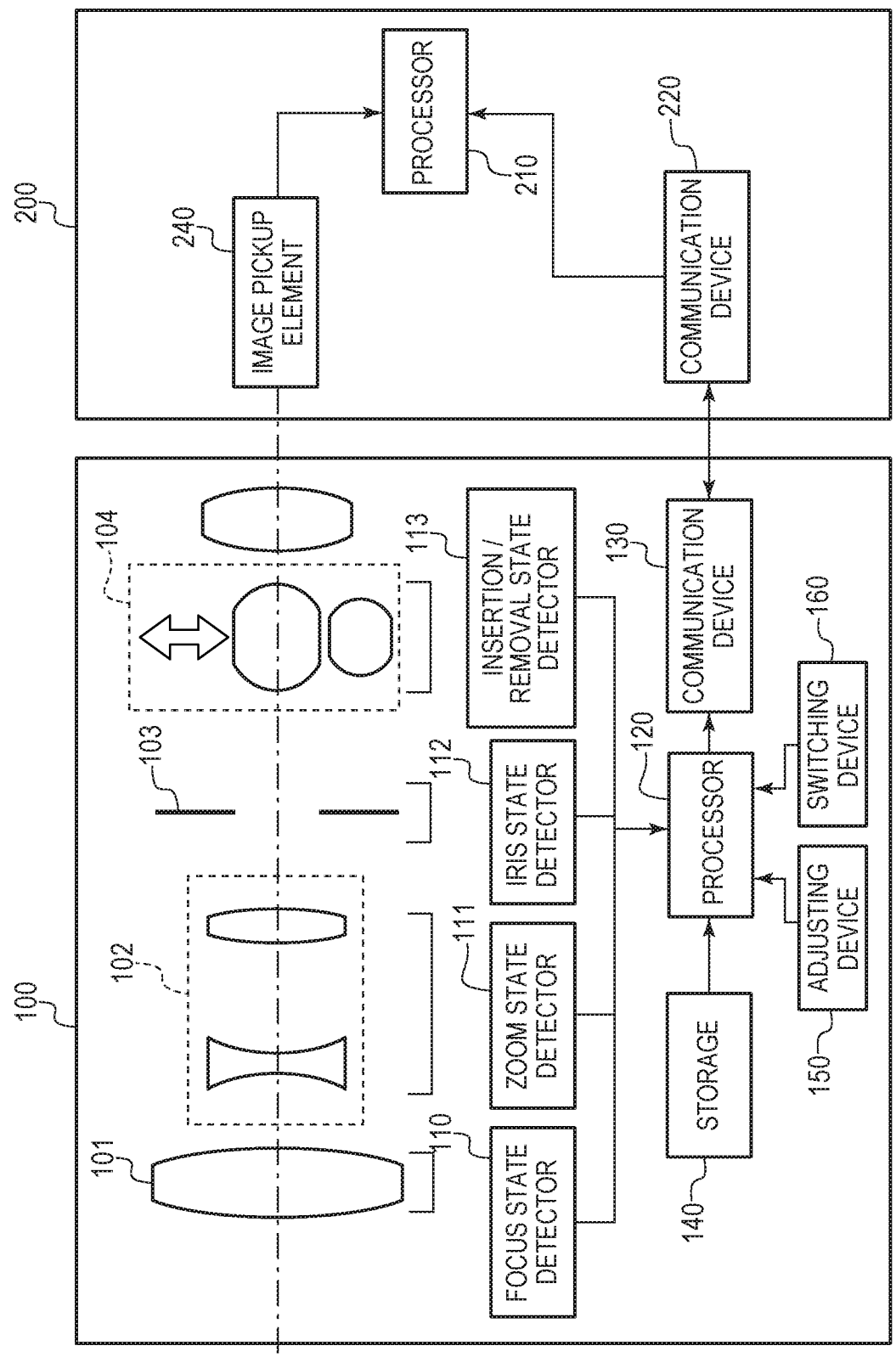
FIG. 7 is a diagram for illustrating an exemplary configuration of an image pickup apparatus according to a second embodiment of the disclosure.

FIG. 7 is a diagram for illustrating an exemplary configuration of an image pickup apparatus according to a second embodiment of the disclosure. A difference from the exemplary configuration of the image pickup apparatus according to the first embodiment is that the image pickup apparatus includes an extender lens unit 104, and the extender lens unit 104 can selectively be inserted or removed into/from the optical path. Further, another difference is that the image pickup apparatus includes an insertion/removal state detector 113 configured to detect an insertion or removal state of the extender lens unit 104. Further, another difference is that the image pickup apparatus includes an adjusting device 150 configured to adjust the correction amount and a switching device 160 for switching ON/OFF of transmission of correction data. The adjusting device 150 and the switching device 160 each serve as a user interface device. Similarly to the first embodiment, the correction amount is expressed by a cubic expression (Expression (2)) or a quartic expression (Expression (11)) with respect to the image height. The adjusting device 150 can set an adjustment coefficient to be multiplied by all the coefficients of the cubic expression (Expression (2)) or the quartic expression (Expression (11)) in order to adjust the degree of correction of the F-drop. Further, the adjusting device 150 can set an adjustment coefficient to be multiplied by all the coefficients other than constant terms of the cubic expression (Expression (2)) or the quartic expression (Expression (11)) in order to adjust the degree of correction of the peripheral light amount.

Further, the second embodiment is different from the first embodiment in that correction data corresponding to the states of the lens apparatus (state of each of the focus lens unit, the zoom lens unit, the aperture stop, and the extender lens unit) is transmitted to the camera apparatus. Further, as a result, the second embodiment is different from the first embodiment in that the camera apparatus 200 does not include a storage configured to store data for obtaining correction data by interpolation processing.

In Table 1, there is shown correction data for each iris state (F-number at wide angle end) in the state (at wide angle end and focus is at infinity) of the lens apparatus according to the second embodiment. The correction data is coefficients of a quartic polynomial.

In Table 2, there is shown correction data for each iris state (F-number at wide angle end) in the state (focal length of 348.30 mm and focus is at infinity) of the lens apparatus according to the second embodiment. The correction data is coefficients of a quartic polynomial.

Further, in Table 3, there is shown correction data for each iris state (F-number at wide angle end) in the state (at telephoto end and focus is at infinity) of the lens apparatus according to the second embodiment. The correction data is coefficients of a quartic polynomial.

Further, in Table 4, there is shown correction data for each iris state (F-number at wide angle end) in the state (at wide angle end and focus is at infinity) of the lens apparatus according to the second embodiment. The correction data is coefficients of a cubic polynomial.

Further, in Table 5, there are shown values of each conditional expression for the section (A), namely, the correction data of Table 1, Table 2, and Table 3, and values of each conditional expression for the section (B), namely, the correction data of Table 4.

Figure 8:
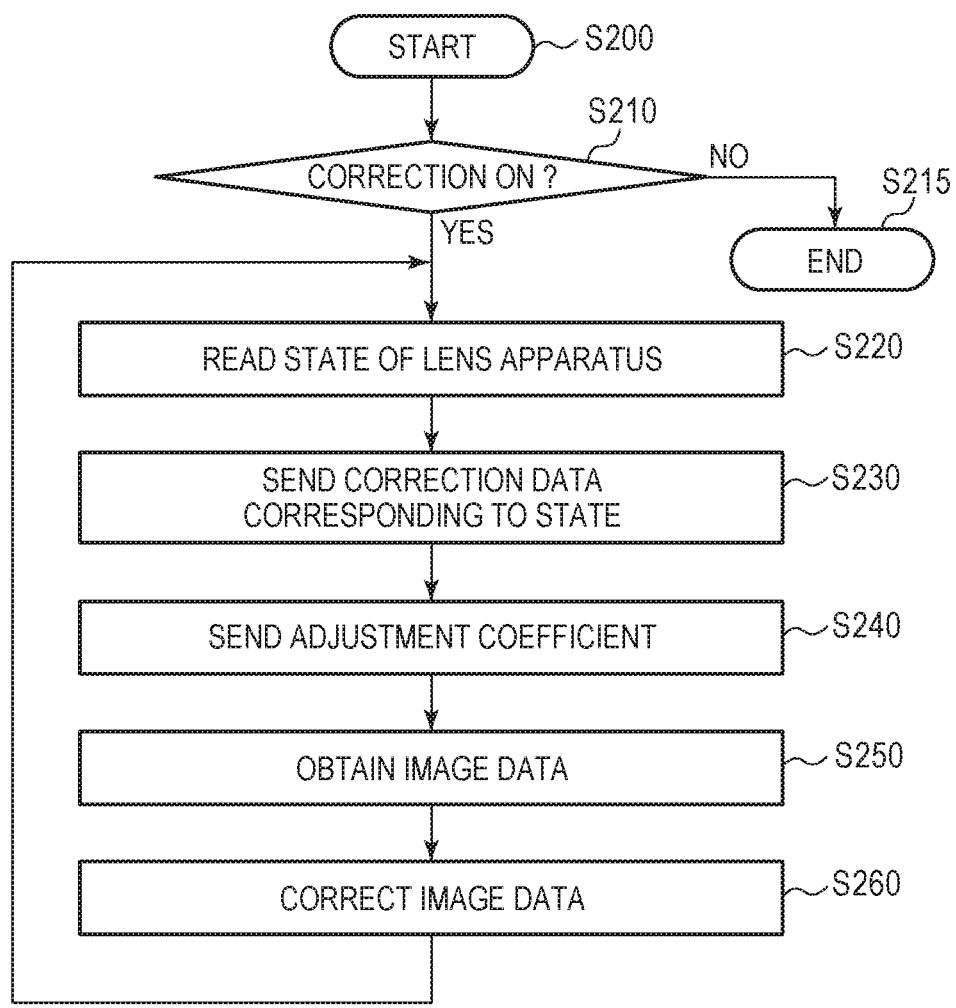
FIG. 8 is a diagram for illustrating a flow of processing in the second embodiment.

FIG. 8 is a diagram for illustrating a flow of processing in the second embodiment. In Step S200, the processing is started. In Step S210, the state of the switching device 160 is obtained first, and when the state is ON for transmission of correction data, the processing proceeds to Step S220. Further, when the state is OFF for transmission of correction data, the processing proceeds to Step S215 and ends. The subsequent processing is processing for one frame of an image (video).

Next, in Step S220, the processor 120 of the lens apparatus 100 obtains respective states from the focus state detector 110, the zoom state detector 111, the iris state detector 103, and the insertion/removal state detector 113. In Step S230, the processor 120 of the lens apparatus 100 reads correction data corresponding to each state (state of lens apparatus) from the storage 140. Then, the processor 120 transmits the correction data to the processor 210 of the camera apparatus 200 via the communication device 130 of the lens apparatus 100 and the communication device 220 of the camera apparatus 200. The correction data stored in the storage 140 is discrete pieces of correction data relating to the state of each of the focus lens unit, the zoom lens unit, and the aperture stop. Thus, when each of the state of the focus lens unit, the zoom lens unit, and the aperture stop is identified, the processor 120 of the lens apparatus 100 generates correction data corresponding to the identified state by interpolation processing.

In Step S240, the processor 120 of the lens apparatus reads an adjustment coefficient from the adjusting device 150, and transmits the adjustment coefficient to the processor 210 of the camera apparatus 200 via the communication device 130 of the lens apparatus 100 and the communication device 220 of the camera apparatus 200.

In Step S250, the processor 210 of the camera apparatus 200 obtains image data (video data) from the image pickup element 240. In Step S270, the processor 210 of the camera apparatus 200 corrects image data by a correction amount that is based on a correction coefficient obtained by multiplying the adjustment coefficient by the correction data. After that, the processing is returned to Step S220, and the processing is continued until a predetermined end condition is satisfied.

In the second embodiment, ON/OFF of transmission of correction data is switched by the switching device 160 of the lens apparatus 100. However, the configuration is not limited thereto. That is, the camera apparatus may include a switching device configured to switch between execution and non-execution of correction processing by the processor 210 of the camera 200, to thereby obtain a similar effect.

Third Embodiment

Figure 9:
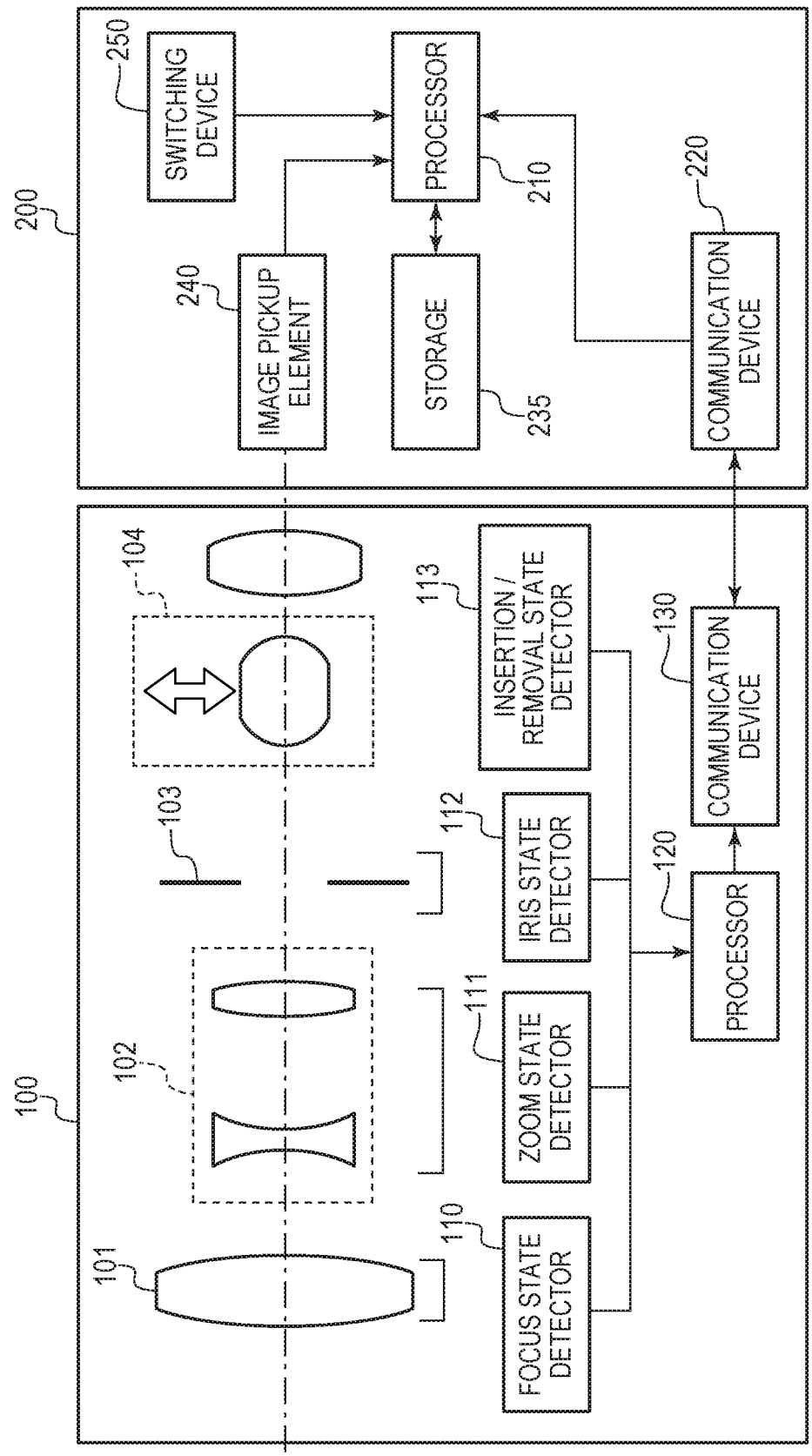
FIG. 9 is a diagram for illustrating an exemplary configuration of an image pickup apparatus according to a third embodiment of the disclosure.

FIG. 9 is a diagram for illustrating an exemplary configuration of an image pickup apparatus according to a third embodiment of the disclosure. A difference from the exemplary configuration of the first embodiment is that the image pickup apparatus includes one or more extender lens unit UEs, which are selectively inserted or removed into/from the optical path, and are configured to shift the focal length range of the lens apparatus by the zoom lens unit in a stepwise manner. Further, another difference is that the image pickup apparatus includes the insertion/removal state detector 113 configured to detect the insertion or removal state of the extender lens unit. Further, another difference is that the lens apparatus 100 does not include the storage 140, and the camera apparatus 200 includes a storage 235 and a switching device 250 configured to switch ON/OFF of correction processing. The switching device 250 may not switch between ON/OFF of correction processing, but may switch ON/OFF of communication to/from the lens apparatus. Further, the exemplary configuration of the third embodiment is different from the exemplary configuration of the first embodiment in that the camera apparatus stores correction data, and in the third embodiment, the lens apparatus 100 and the camera apparatus 200 do not communicate correction data to/from each other. As a result, the communication load is reduced, and high-speed processing can be executed.

Figure 10:
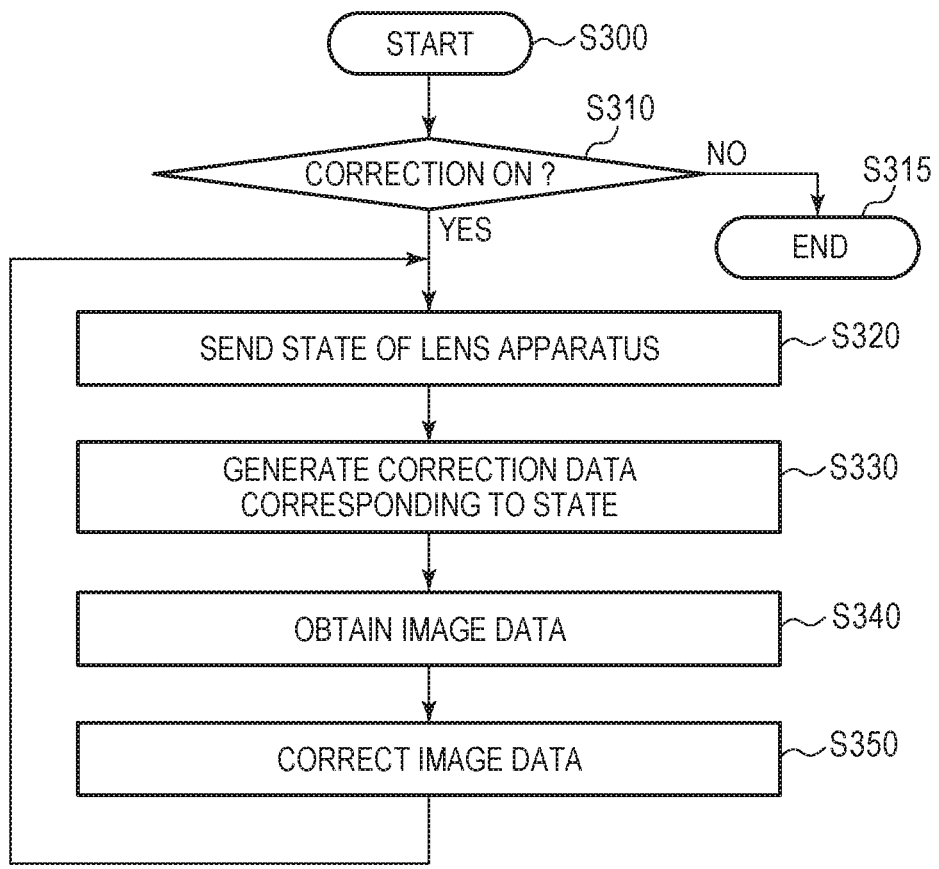
FIG. 10 is a flowchart for illustrating a flow of processing in the third embodiment.
Figure 11:
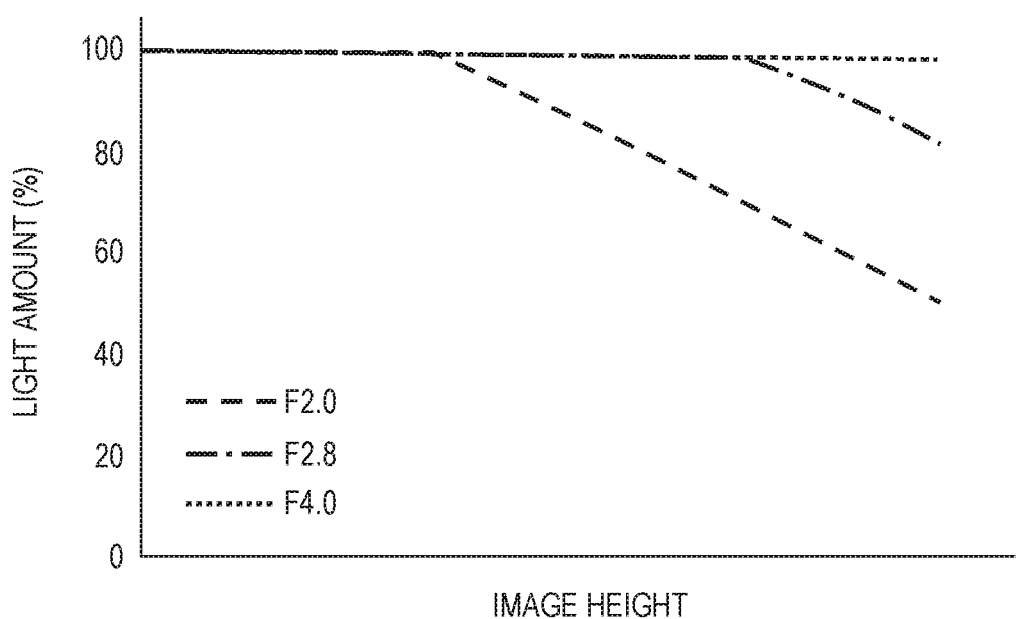
FIG. 11 is a graph for showing a ratio of a light amount at each image height to a light amount at a center of an image.

FIG. 10 is a flowchart for illustrating a flow of processing in the third embodiment. In Step S300, the processing is started. Next, in Step S310, the processor 210 of the camera apparatus 200 examines the state of the switching device 250, and when the state is ON for correction processing, the processing proceeds to Step S320. Further, when the state is OFF for correction processing, the processing proceeds to Step S315 and ends.

In Step S320, the processor 210 of the camera apparatus 200 receives respective states from the detectors 110, 111, 112, and 113 via the communication device 130 of the lens apparatus 100 and the communication device 220 of the camera apparatus 200. In Step S330, the processor 210 of the camera apparatus 200 reads correction data corresponding to the received states (states of lens apparatus) from the storage 235. The correction data stored in the storage 235 is discrete pieces of data relating to each of the states of the focus lens unit, the zoom lens unit, and the aperture stop. Thus, when the processor 210 of the camera apparatus 200 has identified each of the states of the focus lens unit, the zoom lens unit, the aperture stop, and the insertion/removal, the processor 210 generates correction data corresponding to the identified state of the lens apparatus by interpolation processing based on the read correction data. In Step S340, the processor 210 of the camera apparatus 200 obtains image data (video data) from the image pickup element 240. In Step S350, the processor 210 of the camera executes correction processing on image data. After that, the processing is returned to Step S320, and the processing is continued until a predetermined end condition is satisfied.

As described above, it is possible to correct the light amount at each image height by a small amount of data by performing correction based on the coefficient of each order of an n-th order expression with respect to the image height approximating correction data. Only the coefficient of a 0-th term (constant term) may be used for correction processing. For example, only the 0-th order correction data that depends on the state of the lens apparatus may be used for correction without depending on the image height in order to correct decrease in light amount due to an F-drop on the telephoto side. In that case, only the coefficient of the 0-th order term is transmitted from the lens apparatus to the camera apparatus as correction data, or may be stored in advance in the camera apparatus.

Further, in the above-mentioned configuration, the image data is corrected in the camera apparatus having an image processing function, but the configuration is not limited thereto. For example, an external apparatus (image processing apparatus, image processor) different from the camera apparatus and the lens apparatus may execute the correction processing based on image data from the camera apparatus and correction data from the lens apparatus.

The exemplary embodiments of the disclosure are described above, but it is to be understood that the disclosure is not limited to those embodiments and can be modified and changed variously within the scope of the gist thereof.

Numerical Example

| | Unit: mm Surface data | | | | |
|---|---|---|---|---|---|
| Surface number | r | d | nd | vd | Effective diameter |
| 1 | 1,571.411 | 5.91 | 1.90366 | 31.3 | 212.83 |
| 2 | 361.491 | 3.13 | | | 205.43 |
| 3 | 389.831 | 20.85 | 1.43387 | 95.1 | 204.88 |
| 4 | −1,519.134 | 25.29 | | | 203.52 |
| 5 | 379.388 | 19.40 | 1.43387 | 95.1 | 198.91 |
| 6 | −1,690.060 | 0.25 | | | 198.64 |
| 7 | 270.376 | 20.46 | 1.43387 | 95.1 | 194.91 |
| 8 | 5,840.434 | 1.18 | | | 193.83 |
| 9 | 190.778 | 14.41 | 1.59240 | 68.3 | 182.16 |
| 10 | 365.545 | (Variable) | | | 180.35 |
| 11* | 11,015.733 | 2.20 | 2.00330 | 28.3 | 48.62 |
| 12 | 41.065 | 10.49 | | | 41.92 |
| 13 | −62.377 | 1.40 | 1.88300 | 40.8 | 41.20 |
| 14 | 65.176 | 9.88 | 1.95906 | 17.5 | 42.94 |
| 15 | −89.087 | 2.72 | | | 44.24 |

-continued

| | | | | | |
|---|---|---|---|---|---|
| 16 | −51.909 | 1.60 | 1.83400 | 37.2 | 44.38 |
| 17 | −103.320 | (Variable) | | | 46.56 |
| 18 | 115.185 | 11.58 | 1.59201 | 67.0 | 78.76 |
| 19* | −2,087.691 | 0.50 | | | 79.19 |
| 20 | 142.758 | 13.08 | 1.59201 | 67.0 | 80.37 |
| 21 | −231.655 | 0.20 | | | 79.98 |
| 22 | 122.793 | 2.50 | 1.80518 | 25.4 | 76.29 |
| 23 | 57.717 | 18.11 | 1.43387 | 95.1 | 71.81 |
| 24 | −564.234 | 0.50 | | | 70.72 |
| 25* | 364.246 | 6.50 | 1.49700 | 81.5 | 69.60 |
| 26 | −414.835 | (Variable) | | | 68.42 |
| 27 (Stop) | ∞ | 5.89 | | | 31.81 |
| 28 | −147.172 | 1.40 | 1.81600 | 46.6 | 32.30 |
| 29 | 46.924 | 1.05 | | | 31.20 |
| 30 | 37.303 | 4.69 | 1.80810 | 22.8 | 31.30 |
| 31 | 420.501 | 3.37 | | | 30.90 |
| 32 | −76.047 | 1.40 | 1.88300 | 40.8 | 30.60 |
| 33 | 191.170 | 11.30 | | | 30.40 |
| 34 | −41.223 | 1.78 | 1.65160 | 58.5 | 26.67 |
| 35 | 580.472 | 3.52 | 1.80518 | 25.4 | 27.78 |
| 36 | −156.414 | 6.46 | | | 28.43 |
| 37 | −103.332 | 5.71 | 1.70154 | 41.2 | 30.13 |
| 38 | −53.979 | 10.53 | | | 31.42 |
| 39 | −216.194 | 4.49 | 1.50137 | 56.4 | 32.25 |
| 40 | −43.973 | 0.74 | | | 32.44 |
| 41 | −72.585 | 1.30 | 1.88300 | 40.8 | 31.89 |
| 42 | 61.011 | 9.51 | 1.50137 | 56.4 | 32.28 |
| 43 | −35.679 | 0.20 | | | 33.06 |
| 44 | 96.272 | 8.69 | 1.49700 | 81.5 | 32.15 |
| 45 | −31.822 | 1.70 | 1.88300 | 40.8 | 31.45 |
| 46 | −176.143 | 2.14 | | | 31.79 |
| 47 | 50.459 | 8.14 | 1.48749 | 70.2 | 31.95 |
| 48 | −79.751 | 5.00 | | | 31.49 |
| 49 | ∞ | 33.00 | 1.60859 | 46.4 | 60.00 |
| 50 | ∞ | 13.20 | 1.51633 | 64.2 | 60.00 |
| 51 | ∞ | 18.00 | | | 60.00 |
| Image plane | ∞ | | | | |

Aspherical surface data

Eleventh surface

K = −2.61129e+006  A4 = 1.14924e−006  A6 = −4.20242e−010  A8 = 7.06050e−012
A10 = 1.71748e−014  A12 = −3.95143e−018  A14 = −2.50492e−020  A16 = 2.74832e−023
A3 = −7.41007e−007  A5 = −2.86209e−008  A7 = 4.68402e−011  A9 = −6.67517e−013
A11 = −2.87644e−016  A13 = 1.44174e−018  A15 = −1.26241e−021

Nineteenth surface

K = −8.09196e+003  A4 = 2.70610e−007  A6 = 1.07566e−009  A8 = −3.82716e−014
A10 = −1.89869e−016  A12 = 1.74435e−020  A14 = −2.31461e−023  A16 = 5.87253e−027
A3 = −1.02923e−007  A5 = −2.58308e−008  A7 = −1.15844e−011  A9 = 3.14187e−015
A11 = 2.64931e−018  A13 = 8.56747e−022  A15 = −2.81713e−025

Twenty-fifth surface

K = 6.92275e+001  A4 = −4.53959e−007  A6 = −6.59771e−011  A8 = −3.55842e−013
A10 = −1.48669e−016  A12 = 8.98957e−020  A14 = 6.50522e−022  A16 = 1.24233e−026
A3 = 7.06566e−007  A5 = −1.77804e−008  A7 = 3.13155e−011  A9 = 8.81552e−016
A11 = −1.46851e−017  A13 = 1.62371e−021  A15 = −1.37737e−023

Various data

Zoom ratio 69.98

| | Wide angle | Intermediate | Telephoto |
|---|---|---|---|
| Focal length | 8.60 | 348.30 | 601.79 |
| F-number | 1.80 | 1.80 | 3.11 |
| Half angle of view | 32.60 | 0.90 | 0.52 |
| Image height | 5.50 | 5.50 | 5.50 |
| Total lens length | 624.07 | 624.07 | 624.07 |
| BF | 52.17 | 52.17 | 52.17 |
| d10 | 3.03 | 178.44 | 184.56 |
| d17 | 279.71 | 41.05 | 15.69 |
| d26 | 3.00 | 66.25 | 85.49 |
| d33 | 11.30 | 11.30 | 11.30 |
| Entrance pupil position | 126.14 | 3,247.76 | 6,438.93 |
| Exit pupil position | 141.46 | 141.46 | 141.46 |

-continued

| | | | |
|---|---|---|---|
| Front principal point position | 135.34 | 4,578.71 | 9,974.12 |
| Rear principal point position | 9.40 | −330.30 | −583.79 |

Zoom lens unit data

| Unit | First surface | Focal length | Lens structure length | Front principal point position | Rear principal point position |
|---|---|---|---|---|---|
| 1 | 1 | 248.14 | 110.88 | 64.60 | −17.20 |
| 2 | 11 | −27.25 | 28.28 | 3.76 | −16.43 |
| 3 | 18 | 70.50 | 52.98 | 12.00 | −25.30 |
| 4 | 27 | −50.95 | 17.80 | 11.51 | −2.55 |
| 5 | 34 | −411.92 | 17.46 | −49.56 | −70.97 |
| 6 | 39 | 52.26 | 36.91 | 20.24 | −4.47 |
| 7 | 49 | ∞ | 46.20 | 14.58 | −14.58 |

Single lens data

| Lens | First surface | Focal length |
|---|---|---|
| 1 | 1 | −516.86 |
| 2 | 3 | 715.59 |
| 3 | 5 | 714.36 |
| 4 | 7 | 651.06 |
| 5 | 9 | 651.23 |
| 6 | 11 | −40.75 |
| 7 | 13 | −35.70 |
| 8 | 14 | 39.99 |
| 9 | 16 | −126.08 |
| 10 | 18 | 184.10 |
| 11 | 20 | 150.63 |
| 12 | 22 | −136.36 |
| 13 | 23 | 121.45 |
| 14 | 25 | 390.18 |
| 15 | 28 | −43.24 |
| 16 | 30 | 49.86 |
| 17 | 32 | −61.11 |
| 18 | 34 | −58.76 |
| 19 | 35 | 151.95 |
| 20 | 37 | 152.86 |
| 21 | 39 | 108.69 |
| 22 | 41 | −37.15 |
| 23 | 42 | 46.24 |
| 24 | 44 | 49.09 |
| 25 | 45 | −43.97 |
| 26 | 47 | 64.51 |
| 27 | 49 | 0.00 |
| 28 | 50 | 0.00 |

(A) Correction data for quartic polynomial

TABLE 1

(when focus is at infinity at wide angle end)

| F-number | $A_4$ | $A_3$ | $A_2$ | $A_1$ | $A_0$ |
|---|---|---|---|---|---|
| 1.80 | 1.12E−03 | −1.01E−02 | 3.44E−02 | 1.24E−02 | 1.00E+00 |
| 1.88 | 1.05E−03 | −1.17E−02 | 5.04E−02 | −3.19E−02 | 1.00E+00 |
| 1.96 | −5.19E−04 | 3.97E−03 | 6.03E−03 | −1.15E−02 | 1.00E+00 |
| 2.00 | −7.03E−04 | 6.23E−03 | −1.86E−02 | −8.51E−03 | 1.00E+00 |
| 2.18 | −2.04E−04 | 3.72E−03 | −5.77E−03 | −3.28E−03 | 1.00E+00 |
| 2.38 | 2.52E−04 | 1.78E−04 | −2.62E−03 | 7.47E−04 | 1.00E+00 |
| 2.59 | 1.90E−03 | −1.73E−02 | 5.06E−02 | −4.22E−02 | 1.00E+00 |
| 2.83 | 5.60E−04 | −5.11E−03 | 1.62E−02 | −1.68E−02 | 1.00E+00 |
| 3.08 | 2.06E−04 | −2.44E−03 | 1.00E−02 | −1.13E−02 | 1.00E+00 |
| 3.51 | 3.41E−05 | −4.19E−04 | 2.26E−03 | −1.25E−03 | 1.00E+00 |
| 3.83 | −6.02E−07 | −2.93E−05 | 9.32E−04 | 4.70E−05 | 1.00E+00 |
| 4.18 | −1.07E−06 | −2.48E−05 | 9.36E−04 | 4.56E−05 | 1.00E+00 |
| 4.56 | −1.20E−06 | 9.05E−06 | 5.84E−04 | 3.44E−04 | 1.00E+00 |
| 4.97 | −2.27E−06 | −2.83E−05 | 1.06E−03 | −1.77E−04 | 1.00E+00 |
| 5.66 | −3.84E−06 | −1.79E−05 | 1.06E−03 | −2.17E−04 | 1.00E+00 |
| 6.17 | −3.39E−06 | −1.44E−05 | 1.03E−03 | −1.65E−04 | 1.00E+00 |
| 6.73 | −8.60E−07 | −3.52E−05 | 1.08E−03 | −1.66E−04 | 1.00E+00 |
| 8.00 | −1.79E−06 | −2.50E−05 | 1.05E−03 | −1.38E−04 | 1.00E+00 |
| 9.51 | −3.25E−06 | −8.93E−06 | 1.01E−03 | −8.72E−05 | 1.00E+00 |
| 11.31 | −3.84E−06 | −5.68E−06 | 1.01E−03 | −1.01E−04 | 1.00E+00 |
| 16.00 | −2.62E−06 | −1.10E−05 | 1.01E−03 | −6.60E−05 | 1.00E+00 |
| 22.63 | −2.76E−06 | −9.58E−06 | 1.01E−03 | −8.79E−05 | 1.00E+00 |

TABLE 2

(when focal length is 348.30 mm and focus is at infinity)

| F-number | $A_4$ | $A_3$ | $A_2$ | $A_1$ | $A_0$ |
|---|---|---|---|---|---|
| 1.80 | 9.50E−04 | −6.34E−02 | 4.60E−02 | 5.64E−02 | 1.00E+00 |
| 1.88 | 2.38E−03 | −2.21E−02 | 1.04E−01 | −5.45E−02 | 1.00E+00 |
| 1.96 | 3.59E−04 | −2.30E−03 | 4.76E−02 | −4.48E−02 | 1.00E+00 |
| 2.00 | −1.03E−04 | 2.98E−03 | 2.77E−02 | −3.39E−02 | 1.00E+00 |
| 2.18 | −1.92E−03 | 2.39E−02 | −5.60E−02 | 3.27E−02 | 1.00E+00 |
| 2.38 | −4.39E−04 | 1.19E−02 | −4.09E−02 | 3.45E−02 | 1.00E+00 |
| 2.59 | 1.00E−03 | −3.36E−03 | −1.00E−03 | 7.27E−03 | 1.00E+00 |

TABLE 2-continued (when focal length is 348.30 mm and focus is at infinity)

| F-number | $A_4$ | $A_3$ | $A_2$ | $A_1$ | $A_0$ |
|---|---|---|---|---|---|
| 2.83 | 1.79E−03 | −1.38E−02 | 3.29E−02 | −2.14E−02 | 1.00E+00 |
| 3.08 | 9.31E−04 | −8.08E−03 | 2.20E−02 | −1.59E−02 | 1.00E+00 |
| 3.51 | 2.45E−05 | −2.78E−04 | 1.75E−03 | −8.73E−04 | 1.00E+00 |
| 3.83 | −8.08E−06 | 2.69E−05 | 8.97E−04 | −1.54E−04 | 1.00E+00 |
| 4.18 | −7.49E−06 | 2.54E−05 | 9.00E−04 | −1.44E−04 | 1.00E+00 |
| 4.56 | −6.64E−06 | 2.00E−05 | 9.17E−04 | −1.56E−04 | 1.00E+00 |
| 4.97 | −6.08E−06 | 1.66E−05 | 9.27E−04 | −1.47E−04 | 1.00E+00 |
| 5.66 | −5.69E−06 | 1.58E−05 | 9.26E−04 | −1.20E−04 | 1.00E+00 |
| 6.17 | −5.68E−06 | 1.73E−05 | 9.20E−04 | −9.91E−05 | 1.00E+00 |
| 6.73 | −5.71E−06 | 1.88E−05 | 9.14E−04 | −7.99E−05 | 1.00E+00 |
| 8.00 | −5.61E−06 | 1.96E−05 | 9.10E−04 | −5.05E−05 | 1.00E+00 |
| 9.51 | −4.93E−06 | 1.35E−05 | 9.29E−04 | −4.66E−05 | 1.00E+00 |
| 11.31 | −5.13E−06 | 1.64E−05 | 9.20E−04 | −2.05E−05 | 1.00E+00 |
| 16.00 | −4.40E−06 | 9.23E−06 | 9.46E−04 | −4.13E−05 | 1.00E+00 |
| 22.63 | −4.09E−06 | 1.33E−05 | 8.94E−04 | 1.08E−04 | 1.00E+00 |

TABLE 3

(when focus is at infinity at telephoto end)

| F-number | $A_4$ | $A_3$ | $A_2$ | $A_1$ | $A_0$ |
|---|---|---|---|---|---|
| 1.80 | 1.16E−03 | 2.00E−02 | −9.61E−02 | 1.02E−02 | 3.02E+00 |
| 1.88 | 1.06E−03 | 1.84E−02 | −8.81E−02 | 9.32E−02 | 2.77E+00 |
| 1.96 | 9.74E−04 | 1.68E−02 | −8.08E−02 | 8.54E−02 | 2.54E+00 |
| 2.00 | 9.38E−04 | 1.62E−02 | −7.78E−02 | 8.23E−02 | 2.44E+00 |
| 2.18 | 1.23E−03 | 1.00E−02 | −5.62E−02 | 6.20E−02 | 2.05E+00 |
| 2.38 | 3.69E−04 | 1.35E−02 | −5.87E−02 | 5.87E−02 | 1.73E+00 |
| 2.59 | 1.30E−03 | −3.20E−03 | 1.04E−02 | −8.63E−03 | 1.45E+00 |
| 2.83 | 2.53E−03 | −2.26E−02 | 8.63E−02 | −6.51E−02 | 1.22E+00 |
| 3.08 | 6.76E−04 | −6.10E−03 | 3.11E−02 | 2.98E−02 | 1.03E+00 |
| 3.51 | −2.40E−04 | 2.96E−04 | 2.92E−02 | −3.17E−02 | 1.00E+00 |
| 3.83 | −1.21E−03 | 1.23E−02 | −1.60E−02 | −1.62E−03 | 1.00E+00 |
| 4.18 | −8.47E−04 | 1.20E−02 | −3.06E−02 | 1.92E−02 | 1.00E+00 |
| 4.56 | −4.35E−04 | 8.95E−03 | −3.02E−02 | 2.62E−02 | 1.00E+00 |
| 4.97 | 4.33E−04 | −1.25E−04 | −5.70E−03 | 8.57E−03 | 1.00E+00 |
| 5.66 | 1.47E−03 | −1.16E−02 | 2.86E−02 | −1.88E−02 | 1.00E+00 |
| 6.17 | 1.06E−03 | −9.14E−03 | 2.47E−02 | −1.79E−02 | 1.00E+00 |
| 6.73 | 3.07E−04 | −2.80E−03 | 8.70E−03 | −6.68E−03 | 1.00E+00 |
| 8.00 | −4.37E−04 | 5.54E−06 | 9.64E−04 | −1.41E−04 | 1.00E+00 |
| 9.51 | −6.52E−06 | 2.99E−05 | 8.82E−04 | −2.98E−05 | 1.00E+00 |
| 11.31 | −5.54E−06 | 2.16E−05 | 9.04E−04 | −2.71E−05 | 1.00E+00 |
| 16.00 | −5.46E−06 | 2.44E−05 | 8.78E−04 | 6.09E−05 | 1.00E+00 |
| 22.63 | −7.46E−06 | 5.11E−05 | 7.63E−04 | 2.58E−04 | 1.00E+00 |

(B) Correction data for cubic polynomial

TABLE 4

(when focus is at infinity at wide angle end)

| F-number at wide angle end | $A_3$ | $A_2$ | $A_1$ | $A_0$ |
|---|---|---|---|---|
| 1.80 | 1.12E−05 | 5.24E−03 | 4.37E−02 | 1.00E+00 |
| 2.59 | 3.12E−03 | −1.70E−02 | 2.26E−02 | 1.00E+00 |
| 3.51 | −3.19E−05 | 8.95E−04 | 1.40E−04 | 1.00E+00 |
| 5.19 | −4.61E−05 | 1.13E−03 | −3.52E−04 | 1.00E+00 |
| 8.00 | −4.03E−05 | 1.09E−03 | −1.42E−04 | 1.00E+00 |
| 11.31 | −4.01E−05 | 1.10E−03 | −1.53E−04 | 1.00E+00 |

Values of each conditional expression relating to correction data

TABLE 5

| Expression number | Conditional Expression | (A) | (B) |
|---|---|---|---|
| (3) | Ft/Fd | 1.73 | 1.73 |
| (4) | (Fd−Fw)/Log(fd/fw) | 0 | 0 |
| (5) | Fwp_2/Fw | 1.11 | 1.95 |
| (6) | Fwp_2/Fwp_1 | 1.02 | 1.35 |
| (8) | N02/Nall | 0.41 | 0.33 |
| (11) | N23/Nall | 0.18 | 0.17 |
| (13) | $A_{0(ft)}/A_{0(fd)}$ | 3.02 | 3.02 |
| (14) | $(A_{0(ft)}-A_{0(fw)})/\text{Log}(fd/fw)$ | 0 | 0 |

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') and/or reads out and uses computer readable data recorded on the storage medium to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium and/or reading out and using the computer readable data from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-234727, filed Dec. 14, 2018, which is hereby incorporated by reference herein in its entirety.

What is claimed is:

1. A lens apparatus including an aperture stop, configured to form an image via the aperture stop and detachably mountable to a camera apparatus, the lens apparatus comprising:
a storage storing correction data for correcting image data obtained by image pickup by the camera apparatus with respect to a light amount distribution in the image; and
a communication device configured to transmit the correction data to an external apparatus,
wherein the correction data includes a coefficient of an n-th order polynomial (where n is a non-negative integer) with respect to an image height, the correction data corresponding to each of a plurality of states of the aperture stop, wherein inequalities $$1.10 < Ft/Fd < 4.00; \text{ and}$$

$$-0.01 < (Fd-Fw)/\text{Log}(fd/fw) < 1.20$$

are satisfied where Fw represents a minimum F-number at a wide angle end, Ft represents a minimum F-number at a telephoto end, fw represents a focal length at the wide angle end, ft represents a focal length at the telephoto end, and Fd represents a minimum F-number at a focal length fd expressed by fd=Fw/Ft×ft, and wherein the correction data satisfies inequalities $$1.00 < Fwp\_2/Fw < 2.00; \text{ and}$$

$$Fwp\_2/Fwp\_1 < 1.41,$$

where Fwp_1 and Fwp_2 represent two F-numbers at the wide angle end respectively corresponding to two states of the plurality of states of the aperture stop in order from a maximum aperture side to a minimum aperture side of the aperture stop.

2. The lens apparatus according to claim 1, wherein an inequality $$0.30 < N02/\text{Nall}$$

is satisfied where Nall represents a total number of Fwp in the correction data, Fwp representing an F-number at the wide angle end corresponding to a state of the aperture stop, N02 represents a number of Fwp in the correction data in a case where Fwp satisfies an inequality $$1.00 < Fwp/Fw < 2.00.$$

3. The lens apparatus according to claim 1, wherein the storage stores the correction data with respect to two or more Fwp satisfying an inequality $$1.00 < Fwp/Fw < 1.19,$$

where Fwp represents an F-number at the wide angle end corresponding to a state of the aperture stop.

4. The lens apparatus according to claim 1, wherein an inequality $$0.10 < N23/\text{Nall}$$

is satisfied where Nall represents a total number of Fwp in the correction data, Fwp representing an F-number at the wide angle end corresponding to a state of the aperture stop, N23 represents a number of Fwp in the correction data in a case where Fwp satisfies an inequality $$2.00 < Fwp/Fw < 3.00.$$

5. The lens apparatus according to claim 1, further comprising:
a zoom lens unit configured to move for zooming; and
a focus lens unit configured to move for focusing,
wherein the storage stores the correction data with respect to each of a plurality of combinations of a state of the zoom lens unit, a state of the focus lens unit, and a state of the aperture stop.

6. The lens apparatus according to claim 1, wherein the coefficient includes a coefficient $A_0$, a coefficient $A_1$, a coefficient $A_2$, and a coefficient $A_3$ of a third order polynomial as the n-th order polynomial, the third order polynomial expressed as $$D = A_3 \times h^3 + A_2 \times h^2 + A_1 \times h + A_0,$$

where D represents a correction amount, and h represents the image height.

7. The lens apparatus according to claim 1, wherein the coefficient includes a coefficient $A_0$, a coefficient $A_1$, a coefficient $A_2$, a coefficient $A_3$, and a coefficient $A_4$ of a fourth order polynomial as the n-th order polynomial, the fourth order polynomial expressed as $$D = A_4 \times h^4 + A_3 \times h^3 + A_2 \times h^2 + A_1 \times h + A_0,$$

where D represents a correction amount, and h represents the image height.

8. The lens apparatus according to claim 1, further comprising a user interface device configured to set a coefficient of each term of the n-th order polynomial.

9. The lens apparatus according to claim 1, wherein the communication device is configured to transmit, as the coefficient, only a coefficient of a 0-th order term of the n-th order polynomial, to the external apparatus.

10. The lens apparatus according to claim 5, wherein the communication device is configured to transmit, as the correction data, correction data with respect to each of a plurality of combinations of at least a state of the aperture stop and a state of the zoom lens unit, to the external apparatus.

11. The lens apparatus according to claim 5, further comprising a lens unit closer to an image side than the aperture stop,
wherein the focus lens unit, the aperture stop, and the lens unit closer to the image side than the aperture stop are configured not to move for zooming.

12. The lens apparatus according to claim 7, wherein inequalities $$1.21 < A_{0(ft)}/A_{0(fd)} < 16.00; \text{ and}$$

$$-0.01 < (A_{0(fd)} - A_{0(fw)})/\text{Log}(fd/fw) < 0.50$$

are satisfied where $A_{0(fw)}$, $A_{0(ft)}$, and $A_{0(fd)}$ represent the coefficient $A_0$ at the focal length fw, the coefficient $A_0$ at the focal length ft, and the coefficient $A_0$ at the focal length fd, respectively.

13. The lens apparatus according to claim 1, further comprising:
an extender lens unit configured to be inserted into and removed from an optical path; and
a detector configured to detect a state of insertion or removal of the extender lens unit,
wherein the storage stores the correction data with respect to each of the state of the insertion and the state of the removal.

14. A processing apparatus configured to execute processing of correcting the image data based on the correction data received from the lens apparatus of claim 1.

15. A camera apparatus comprising the processing apparatus of claim 14.

16. An image pickup apparatus comprising:
a lens apparatus including an aperture stop, configured to form an image via the aperture stop and detachably mountable to a camera apparatus; and
an image pickup element configured to receive light of an image formed by the lens apparatus,
wherein the lens apparatus comprises:
a storage storing correction data for correcting image data obtained by image pickup by the camera apparatus with respect to a light amount distribution in the image; and
a communication device configured to transmit the correction data to an external apparatus, wherein the correction data includes a coefficient of an n-th order polynomial (where n is a non-negative integer) with respect to an image height, the correction data corresponding to each of a plurality of states of the aperture stop, wherein inequalities $$1.10 < Ft/Fd < 4.00; \text{ and}$$

$$-0.01 < (Fd-Fw)/\text{Log}(fd/fw) < 1.20$$

are satisfied where Fw represents a minimum F-number at a wide angle end, Ft represents a minimum F-number at a telephoto end, fw represents a focal length at the wide angle end, ft represents a focal length at the telephoto end, and Fd represents a minimum F-number at a focal length fd expressed by fd=Fw/Ft×ft, and wherein the correction data satisfies inequalities $$1.00 < Fwp\_2/Fw < 2.00; \text{ and}$$

$$Fwp\_2/Fwp\_1 < 1.41,$$

where Fwp_1 and Fwp_2 represent two F-numbers at the wide angle end respectively corresponding to two states of the plurality of states of the aperture stop in order from a maximum aperture side to a minimum aperture side of the aperture stop.

17. A storage medium storing correction data for correcting an image data obtained by image pickup by a camera apparatus with respect to a light amount distribution in an image formed by a lens apparatus including an aperture stop, configured to form the image via the aperture stop and detachably mountable to the camera apparatus, wherein the lens apparatus satisfies inequalities $$1.10 < Ft/Fd < 4.00; \text{ and}$$

$$-0.01 < (Fd-Fw)/\text{Log}(fd/fw) < 1.20,$$

where Fw represents a minimum F-number at a wide angle end, Ft represents a minimum F-number at a telephoto end, fw represents a focal length at the wide angle end, ft represents a focal length at the telephoto end, and Fd represents a minimum F-number at a focal length fd expressed by fd=Fw/Ft×ft, wherein the correction data includes a coefficient of an n-th order polynomial (where n is a non-negative integer) with respect to an image height, the correction data corresponding to each of a plurality of states of the aperture stop, wherein the correction data satisfies inequalities $$1.00 < Fwp\_2/Fw < 2.00; \text{ and}$$

$$Fwp\_2/Fwp\_1 < 1.41,$$

where Fwp_1 and Fwp_2 represent two F-numbers at the wide angle end respectively corresponding to two states of the plurality of states of the aperture stop in order from a maximum aperture side to a minimum aperture side of the aperture stop.

18. The storage medium according to claim 17, wherein the lens apparatus satisfies an inequality $$0.30 < N02/Nall,$$

where Nall represents a total number of Fwp in the correction data, Fwp representing an F-number at the wide angle end corresponding to a state of the aperture stop, N02 represents a number of Fwp in the correction data in a case where Fwp satisfies an inequality $$1.00 < Fwp/Fw < 2.00.$$

19. The storage medium according to claim 17, wherein the storage stores the correction data with respect to two or more Fwp satisfies an inequality $$1.00 < Fwp/Fw < 1.19,$$

where Fwp represents an F-number at the wide angle end corresponding to a state of the aperture stop.

20. The storage medium according to claim 17, wherein the lens apparatus satisfies an inequality $$0.10 < N23/Nall,$$

where Nall represents a total number of Fwp in the correction data, Fwp representing an F-number at the wide angle end corresponding to a state of the aperture stop, N23 represents a number of Fwp in the correction data in a case where Fwp satisfies an inequality $$2.00 < Fwp/Fw < 3.00.$$

* * * * *